United States Patent [19]
Yun

[11] Patent Number: 6,066,061
[45] Date of Patent: May 23, 2000

[54] CONTINUOUSLY VARIABLE GEAR TRANSMISSION

[76] Inventor: Yowang Yun, 2915 36$^{th}$ Ave., Apt. 4AB, Long Island City, N.Y. 11106

[21] Appl. No.: 09/287,480

[22] Filed: Apr. 6, 1999

[51] Int. Cl.$^7$ ............................................. F16H 3/02
[52] U.S. Cl. ........................... 475/198; 475/207; 74/416; 74/457
[58] Field of Search ............................ 74/416, 420, 396, 74/461, 406, 412 R, 460, 459.5, 457, 640, 354; 475/198, 207

[56] References Cited

U.S. PATENT DOCUMENTS

| | | | |
|---|---|---|---|
| 2,970,494 | 2/1961 | Lynch ......................................... | 74/348 |
| 4,019,405 | 4/1977 | Winter et al. .......................... | 74/416 X |
| 4,136,573 | 1/1979 | Smilgys et al. ............................ | 74/348 |
| 4,817,464 | 4/1989 | Korban et al. ............................. | 74/793 |
| 4,850,248 | 7/1989 | Korban et al. ............................. | 74/793 |
| 5,222,405 | 6/1993 | Reynolds ............................... | 74/393 X |
| 5,381,704 | 1/1995 | Knotts ..................................... | 74/416 |

OTHER PUBLICATIONS

Derwent Abstract of DE19530357 Published Feb. 1, 1996.
Derwent Abstract of WO9302302 Published Feb. 4, 1993.

*Primary Examiner*—Charles A Marmor
*Assistant Examiner*—Ankur Parekh
*Attorney, Agent, or Firm*—Robert W. J. Usher

[57] ABSTRACT

A continuously variable gear transmission has a hemispherical drive gear providing an axially varying pitch diameter and an axially varying effective circular pitch, and a driven gear with a constant pitch diameter having teeth tapering axially in an opposite sense to the axially varying effective circular pitch of the drive gear. A pitch control drum guides teeth of the driven gear relatively around the shaft axis to continuously vary their effective circular pitch to match a circular pitch of the teeth of the drive gear for ensuring meshing engagement throughout the varying axial positions, whereby the velocity ratio of the transmission is varied continuously. The control drum has a guiding surface extending therearound with an axially tapering, conical guiding portion providing an arcuate guiding surface portion of constant transverse and continuously axially varying radius. An interconnected rod assembly links the adjacent movable teeth together for movement as a ring around the guiding surface of the drum so that the effective circular pitch of the teeth engaging the drive gear is determined by the radius of the guiding portion and so that a tooth engaging the drive gear has a constant angular velocity throughout such engagement, The shaft of the driven gear comprises a plurality of coaxial sub-shafts carrying respective individual teeth mounted coaxially with the drum. A mechanism continuously and simultaneously varies both an angle of intersection of the drive and driven gear shafts, bringing different circumferential locations of the drive gear having different pitch diameters into engagement with the driven gear, and a relative axial position of engagement of the gears, changing a circular pitch of the driven gear to match a circular pitch of the drive gear. A differential connects the selected teeth of the driven gear gear to a power output only when the teeth are at the constant angular velocity.

22 Claims, 20 Drawing Sheets

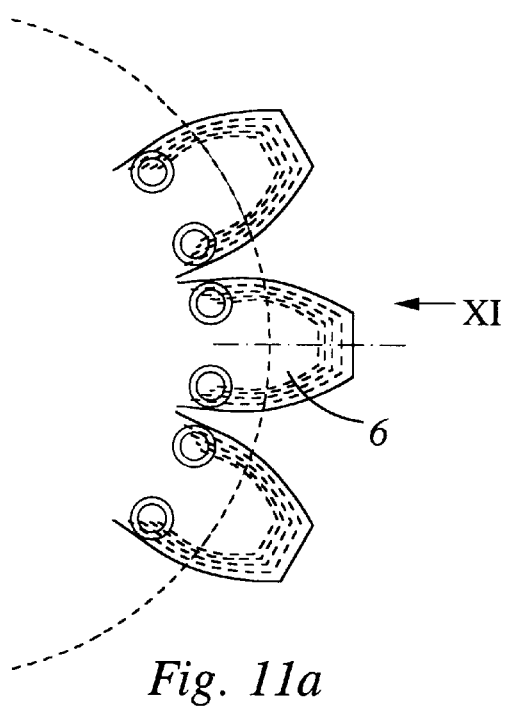
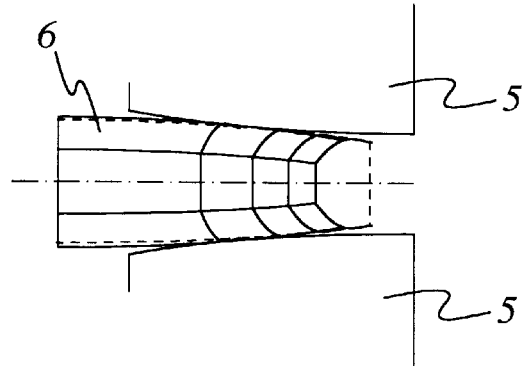
Fig. 11a  Fig. 11b
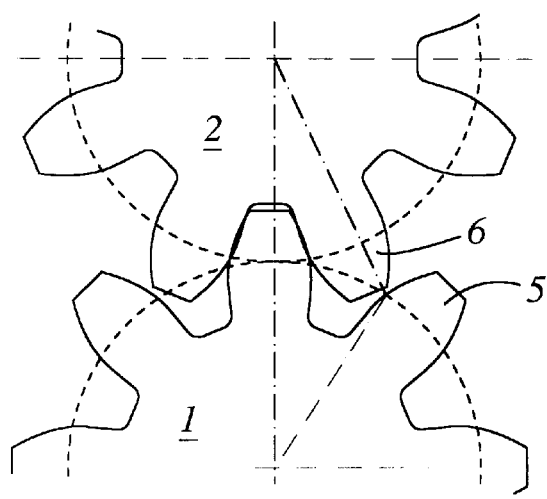
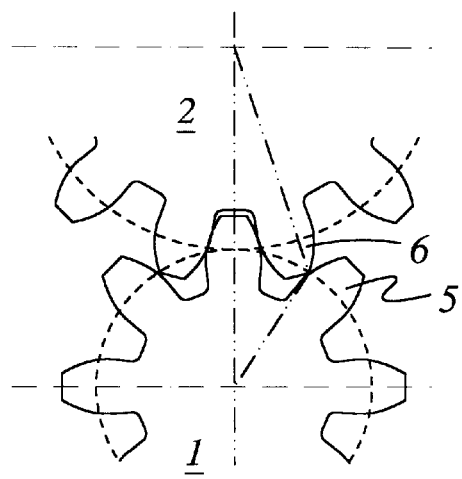
Fig. 12a  Fig. 12b

CONTINUOUSLY VARIABLE GEAR TRANSMISSION

FIELD OF THE INVENTION

The invention relates to a continuously variable gear transmission.

BACKGROUND OF THE INVENTION

There have been many prior attempts over many years to provide practical continuously variable transmissions.

One well known friction type, employs cooperating friction belts and pulleys of varying diameter while another involves cooperation between drive/driven shafts and bodies of continuously varying shape such as cones but the reliance on friction imposes significant limitations on torque while the friction belts or other components in frictional engagement can be subject to wear, requiring inconveniently frequent replacement, increasing the operating costs.

Another approach taught by WO9302302 published in 1993, teaches engagement between a conical pinion and a "hedgehog" wheel with spring loaded teeth which retract and emerge from recesses to accommodate pinion taper as the wheel is displaced along an inclined axis to maintain it in mesh with the conical pinion.

However, the prior proposal does not follow the laws of gearing. In consequence, it is believed that, in practice, a substantial amount of sliding friction will occur between the sprung teeth and the pinion teeth resulting in relatively rapid wear and energy losses.

Other prior approaches involving gears, such as epicyclic arrangements utilizing one-way clutches have resulted in a variable velocity output and relatively low reliability. Furthermore, engine braking is usually not possible.

Another, so-called frictionless approach, taught by U.S. Pat. Nos. 4,817,464 and 4,850,248 issued to Korban et al in 1989 has the disadvantage that the output is not of constant velocity.

SUMMARY OF THE INVENTION

It is one object of the invention to provide an essentially frictionless, continuously variable gear transmission which produces a constant velocity output.

Another object of the invention is to provide a continuously variable gear transmission which permits engine braking.

An additional object of the invention is to provide a continuously variable gear transmission which provides improved efficiency and reliability, increased torque, reducing running costs and increasing service intervals.

According to one aspect of the invention, a continuously variable, gear transmission comprises a drive gear and a driven gear on respective shafts; one of the drive gear and driven gear having a continuous axial taper providing an axially varying pitch diameter, another of the drive gear and driven gear having teeth mounted for relative movement about a shaft axis; means for continuously varying a relative axial position of engagement of the gears so as to vary the effective pitch diameter of the said one gear; and, means for moving teeth of said another gear relatively to continuously vary an effective circular pitch of selected teeth thereof to match a circular pitch of the teeth of said one gear for ensuring meshing engagement throughout the varying axial positions, whereby the velocity ratio of the transmission is varied continuously.

Preferably, said one gear is substantially hemispherical and means are provided for varying an angle of intersection of the shafts thereby bringing different circumferential locations of the said gear having different pitch diameters into engagement with said another gear.

Such arrangement provides a substantially constant velocity output.

The term "substantially hemispherical" includes a somewhat elliptical shape.

More particularly, the invention provides a continuously variable gear transmission comprising: a drive gear and a driven gear on respective shafts; one of the drive gear and driven gear being substantially hemispherical providing an axially varying pitch diameter and an axially varying effective circular pitch, another of the drive gear and driven gear having a constant pitch diameter and having teeth which taper axially in an opposite sense to the axially varying effective circular pitch of said one gear; means for moving teeth of said another gear relatively to continuously vary an effective circular pitch of selected teeth thereof to match a circular pitch of the teeth of said one gear for ensuring meshing engagement throughout the varying axial positions, whereby the velocity ratio of the transmission is varied continuously; the moving means comprising a pitch control drum having a guiding surface extending therearound with an axially tapering, conical guiding portion providing an arcuate guiding surface portion of constant transverse and continuously axially varying radius and means for linking adjacent teeth of said another gear together for relative movement as a ring around the guiding surface of the drum so that the effective circular pitch of selected teeth engaging said one gear is determined by the radius of the guiding portion and so that a tooth engaging said one gear has a constant angular velocity throughout the engagement; the shaft of said another gear comprises a plurality of coaxial sub-shafts carrying respective individual teeth and mounted coaxially with the drum; means for continuously and simultaneously varying both an angle of intersection of the shafts, thereby bringing different circumferential locations of the said one gear having different pitch diameters into engagement with said another gear and a relative axial position of engagement of the gears so as to change a circular pitch of said another gear to match a circular pitch of said one gear; and, means for drivingly connecting the selected teeth of said another gear to one of a power input and output only when the selected teeth are at said constant angular velocity.

The precise profiles of the teeth of the first and second gears required to ensure continuous point contact can readily be determined by the technician according to known laws of gearing. For example, with involute gears, the potentially engaging surfaces of the teeth are formed by an infinite series of involutes extending transversely of the respective rotational axes.

BRIEF DESCRIPTION OF THE DRAWINGS

In order that the invention may be readily understood, specific embodiments of a continuously variable transmission will now be described with reference to the accompanying drawings in which:

FIG. 7b is a side view in direction of arrow VII of FIG. 7a;

FIG. 8b is a side view in direction of arrow VII of FIG. 8a;

FIG. 9b is a side view in direction of arrow IX of FIG. 9a;

FIG. 10b is a side view in direction of arrow X of FIG. 10a;

FIG. 11a is a schematic fragmentary front view of the driven gear showing three teeth;

FIG. 11b is a side view in direction of arrow XI of FIG. 11a showing a single tooth in mesh with teeth of the drive gear;

FIGS. 12a and 12b are fragmentary, diagrammatic front views showing the initial engagement points of teeth of the drive and driven gears at minimum and maximum velocity ratios, respectively;

FIGS. 13a, b and c are diagrammatic front views indicating the angles of separation and locations of teeth of the driven gear at decreasing angles of intersection corresponding to minimum, medial and maximum velocity ratios, respectively, and the corresponding profiles of the control drum, also showing the teeth engagement points at lowest, intermediate and maximum velocity ratios, respectively FIGS. 14a, b, c are diagrammatic side views illustrating the progressive formation of involutes on workpieces precursors of engaging teeth of the drive and driven gears at various angles of intersection, respectively, corresponding to minimum, intermediate, and maximum velocity ratios, respectively, while

DESCRIPTION OF PARTICULAR EMBODIMENTS

Figure 1:
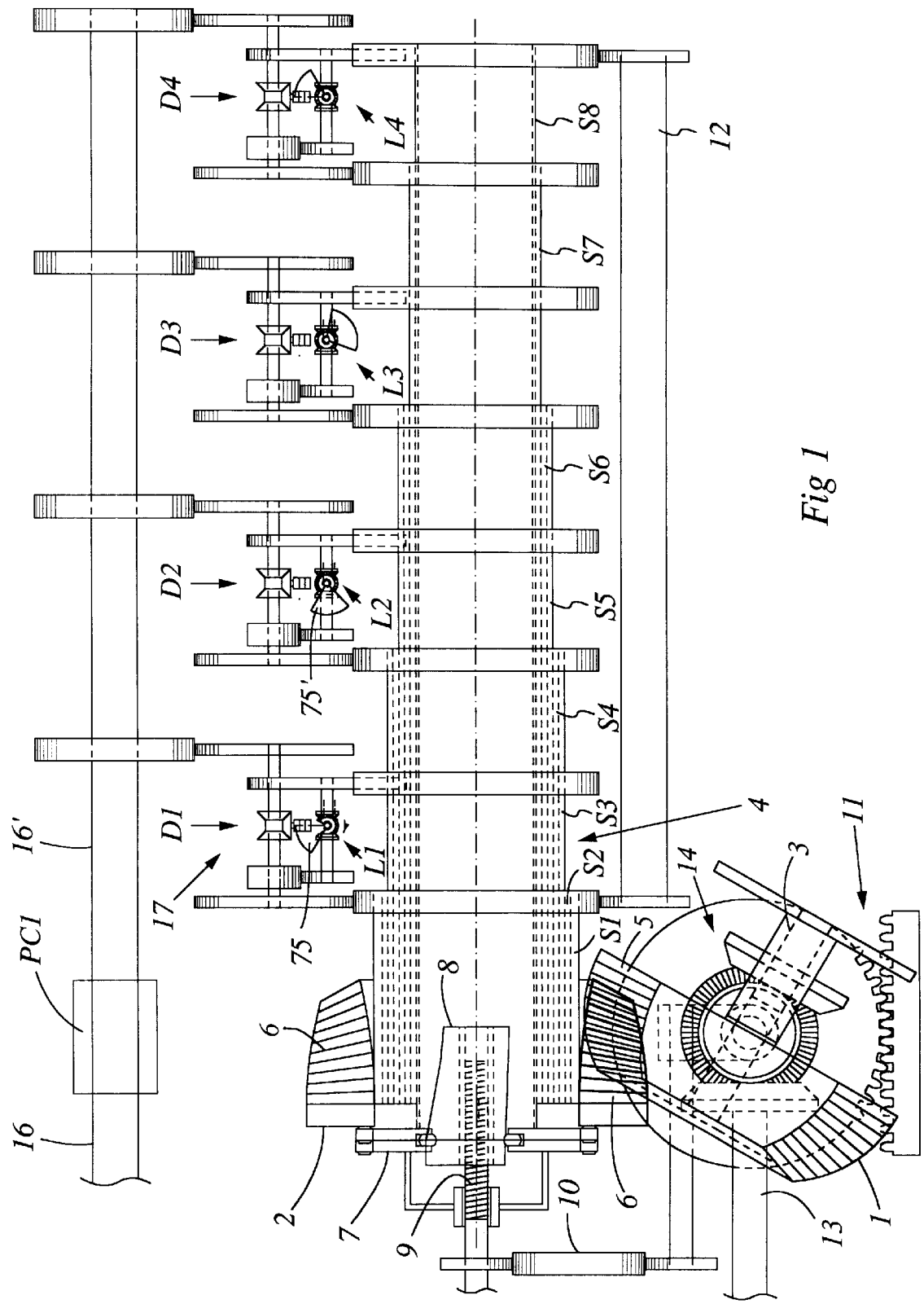
FIG. 1 is a schematic side view of a first embodiment of the transmission, with parts of the drive and driven omitted for clarity.
Figure 2B:
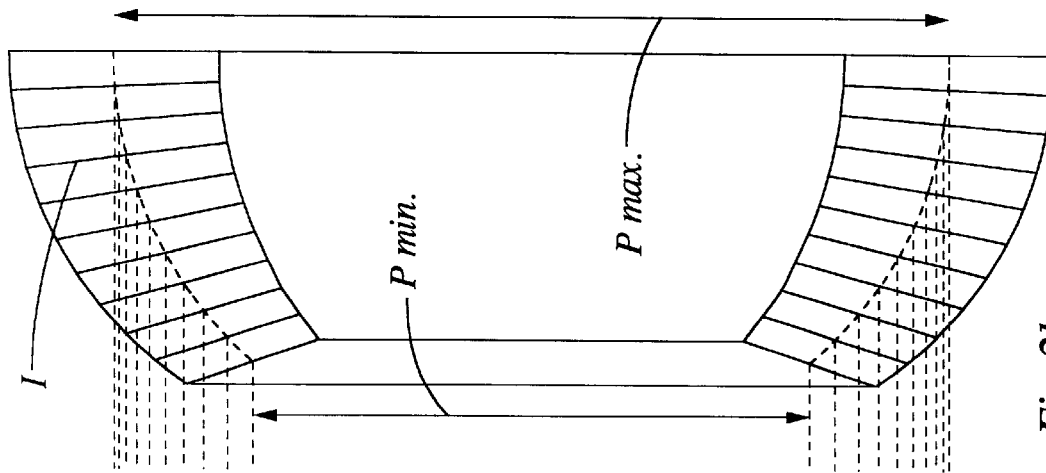
FIGS. 2a and 2b are a schematic front view and an axial cross-sectional view, respectively, of a drive gear of the transmission.
Figure 2A:
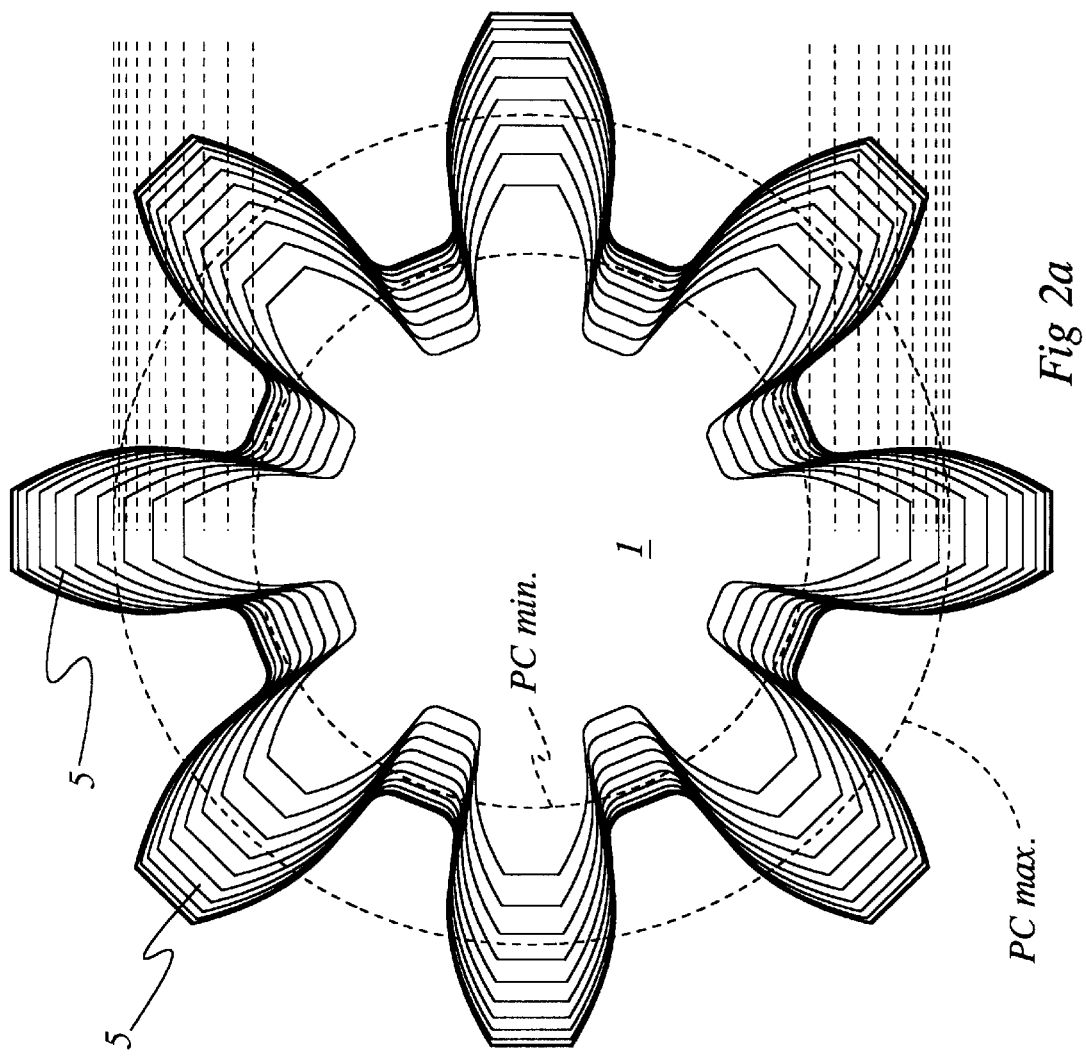

Briefly described, with reference to FIG. 1, the continuously variable gear transmission comprises drive and driven gears 1 and 2, respectively, having respective, coplanar, intersecting shaft and shaft assembly 3 and 4, with respective teeth 5 and 6, in meshing engagement. The drive gear 1 has a dome shape profile, having a continuous axial taper and fixed teeth providing an axially varying effective pitch diameter, whereas the teeth 6 of the driven gear 2 are relatively movable to vary the effective circular pitch, being connected by linkage 7 for relative (circumferential) movement (in the direction of gear rotation) by following an axially varying, eccentric profile of a pitch control drum 8, axially positionable by a lead screw 9. (Alternative embodiments could comprise rack and pinion or other type of mechanisms, for example, for effecting drum movement).

A carriage driven rack and pinion mechanism 11 reciprocates the drive gear 1 axially while varying the angle of intersection, bringing different axially and diametrically spaced portions of the teeth 5 into driving engagement with teeth 6 of the driven gear, continuously varying the pitch diameter of the drive gear and thereby the velocity ratio of the transmission, while the axial movement of the pitch control drum 8 provides continuous variation of the effective circular pitch of engaging portions of the driven gear to match the (effective) circular pitch of engaging portions of teeth 5 of the drive gear at varying angles of intersection ensuring substantially frictionless, continuous point contact between the gears and providing a constant velocity output. (Teeth 6 also taper continuously axially in an opposite sense to teeth 5 of the drive gear.) Input shaft 13 conveys power from a prime mover, such as an internal combustion engine, to the drive gear 1 via input gear train 14 and power from the driven gear 2 is delivered from shaft assembly 4 to an output shaft 16 via a differential mechanism 17.

An optional circular pitch change compensator PC1, is incorporated downstream of the differential mechanism 17 to prevent rotation of the output shaft 16 otherwise caused by axial movement of the pitch control drum 8 in changing the effective circular pitch of the driven gear and by rotation of the drive gear arising from operational movement of the gear train 14 varying the angle of intersection, being transmitted to the common output shaft 16.

An on-board computer receives parameters such as torque, R.P.M., throttle position etc and links servo motors driving the carriage driven rack and pinion mechanism 11 and the pitch control drum 8 which are shown linked, in FIG. 1 for synchronous operation by idler gear 10.

Referring also to FIGS. 2a and 2b, and FIGS. 3–5, which show the drive gear and associated mechanisms, the axial taper (both of effective thickness and radial height) of the drive gear teeth 5 provide engaging portions producing effective pitch diameters which increase continuously as the teeth extend axially rearwardly, from a minimum value indicated by Pmin at the front to a maximum indicated by Pmax at the axially rearmost portion, the ratio of Pmax to Pmin indicating the maximum velocity ratio. The innermost, minimum, and outermost, maximum, effective pitch circles are indicated at PCmin and PCmax, respectively. The broken lines indicate differences in the pitch diameters with variations in tooth contour.

Lines I indicate, schematically, the involutes of respective engaging portions at various angles of intersection. It will be appreciated that, for the purpose of illustration, the lines I are shown as being spaced apart incrementally, whereas, in practice, they are continuous, with an infinite number of involutes, as the angular movement of the drive gear, the variation in pitch diameter and tooth surface are continuous.

Figure 3:
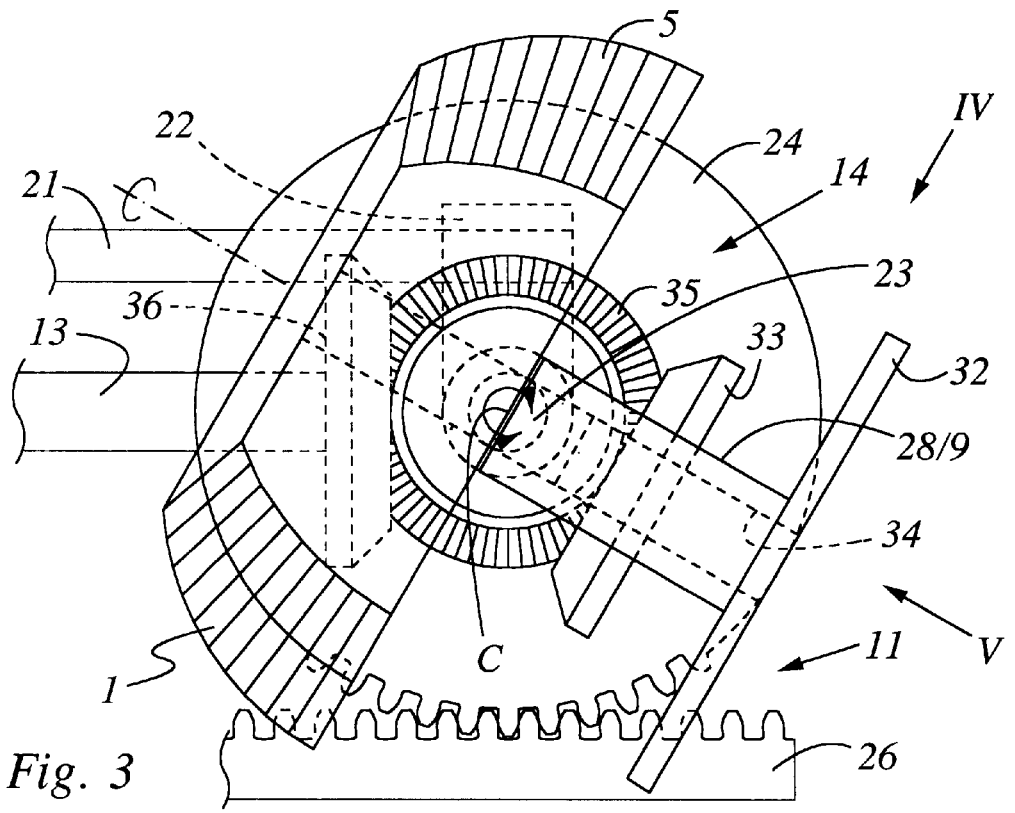
FIG. 3 is a similar view to FIG. 1 showing the mechanism for positioning the drive gear at a greater scale.
Figure 4:
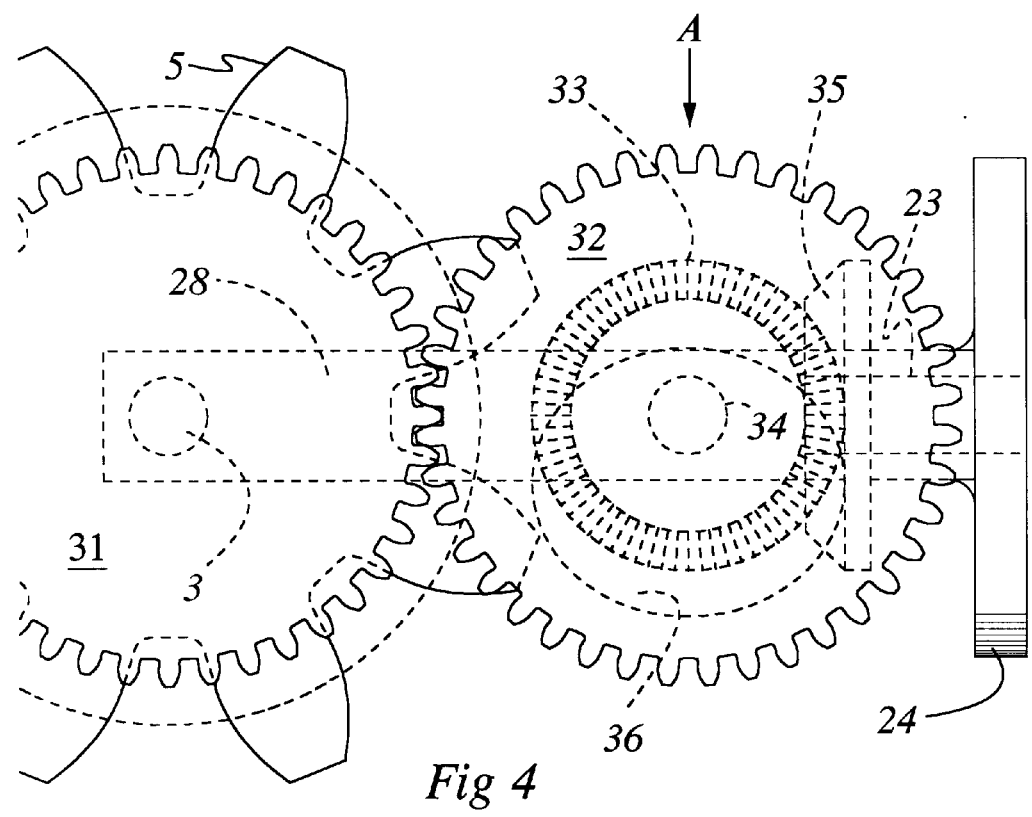
FIG. 4 is a schematic elevational view of the drive gear positioning mechanism in the direction of arrow V, of FIG. 3.
Figure 5:
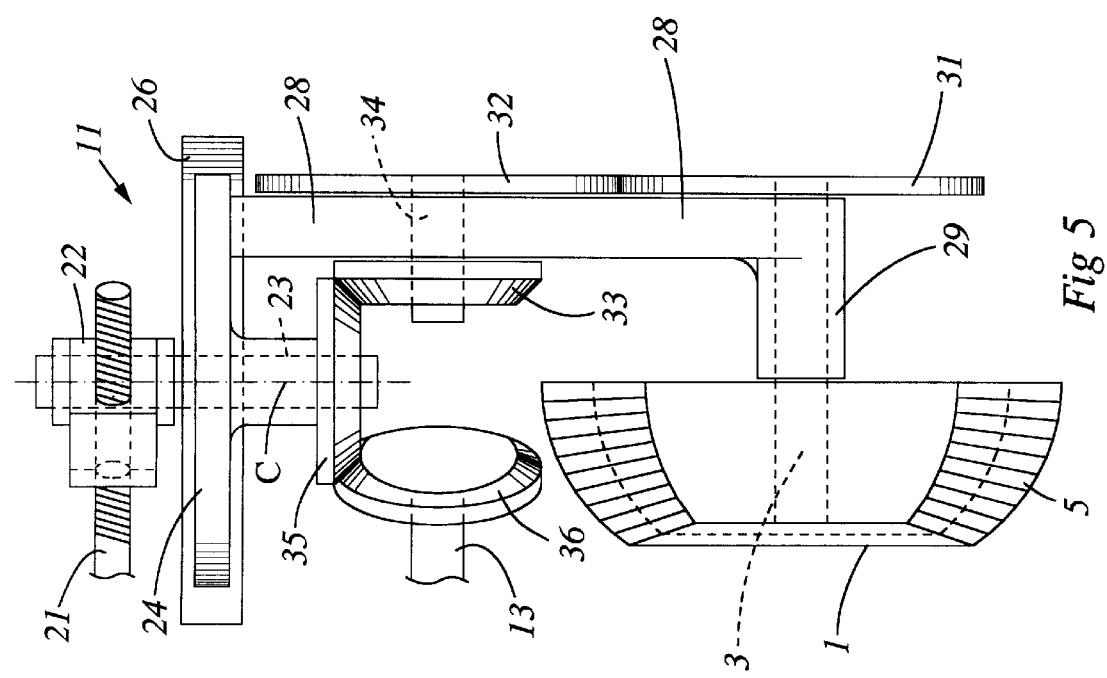
FIG. 5 is an orthogonal view of the drive gear positioning mechanism in the direction of arrow IV, of FIG. 3.

Referring particularly to FIGS. 3–5, the carriage driven rack and pinion 7 mechanism 11, comprises lead screw 21 extending axially from a servo motor, not 8 shown, to operably engage a carriage member 22 carrying transverse pivot shaft 23 on 9 which a control pinion gear 24 is mounted for pivotal movement about axis C while meshed with stationary rack 26. A transverse support arm 28 has one end eccentrically mounted on the control gear 24 and is formed at the other end with an axial bearing portion 29 mounting the shaft 3 which carries drive gear 1 at a forward end thereof.

As described in more detail below, rotation, of the lead screw 21 reciprocates the carriage member axially, pivoting control pinion 24 and support arm 28 to vary both the intersection angle (or pitch) of the drive gear 1 and the axial position, bringing different axial and radial portions of the drive gear teeth 5 into engagement with the driven gear varying the circular pitch and the pitch diameter and, therefore, the velocity ratio of the gear transmission.

A rear end of the shaft 3 carries a spur gear 31 meshed with a idle spur gear 32 combined with bevel gear 33 by axial shaft 34 rotatively mounted in an intermediate portion of support arm 28. Idle bevel gear 35, mounted on a free end of shaft 23 meshes with both bevel gear 33 and input bevel gear 36 carried by the input shaft 13 which is splined to a drive shaft to accommodate the axial reciprocation of the carriage thereby conveying uninterrupted power from the prime mover to the drive gear 1.

The driven gear 2 will now be described in more detail with reference to FIGS. 1, and FIGS. 6a–11b.

Figures 6A, 6B, 6C:
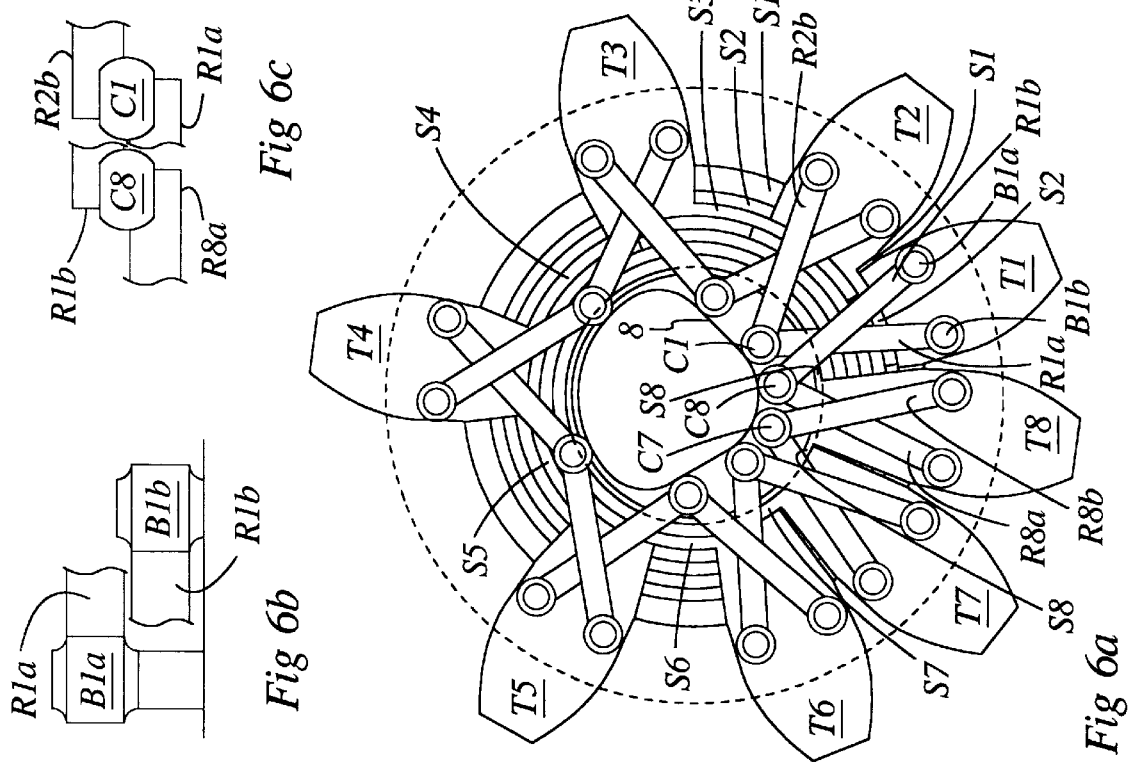
FIG. 6a is a schematic front view of the driven gear of the transmission.
FIGS. 6b and 6c are schematic fragmentary views of the bearings mounting ends of teeth linking rods of the driven gear.

As shown in FIG. 6a, the teeth 6 of the driven gear 2 are eight in number, designated T1–T8, respectively, and are integrally formed with respective axial ends of eight hollow sub-shafts S1–S8 of decreasing diameters, which are nested together coaxially, one inside another for relative rotational movement. Sub-shafts S1–S7 have forward axial ends mounted in coplanar relation and successive adjacent pairs of sub-shafts S1, S2; S3, S4; S5, S6 are of increased rearward axial length while the individual sub-shafts of each pair are of equal length. Sub-shaft S7 is longer, extending further rearward than either of the pair of sub-shafts S6 and S5 while sub-shaft S8 is of greatest length also extending forward of the front ends of the other sub-shaft to provide a bearing surface for the linkage 7, as described below. Each sub-shaft is mounted in a bearing, (not shown).

Figure 7A:
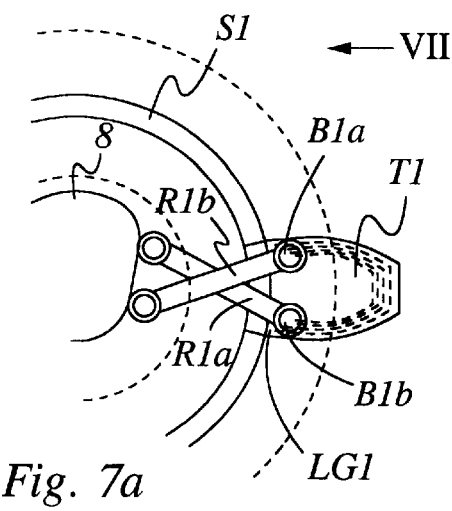
FIG. 7a is a schematic fragmentary front view of the driven gear showing more clearly the position of a first tooth and shaft.
Figure 7B:
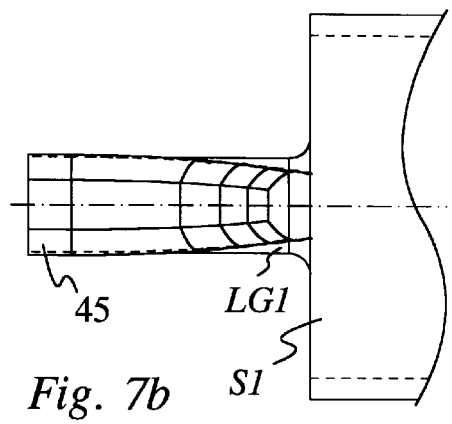

As shown in more detail in FIGS. 7a, 7b, the tooth T1 protrudes axially forward and radially outward from front end of sub shaft S1 and is of increasing thickness as it extends forwards, providing a rearward taper which is opposite in sense, or complementary, to the taper of the teeth 5 of the drive gear, for interdigitation with adjacent teeth of the drive gear as indicated schematically in FIGS. 11a and b. The pitch circle of the driven gear is indicated by broken line PC, (FIGS. 10a and 10b).

Figure 13A:
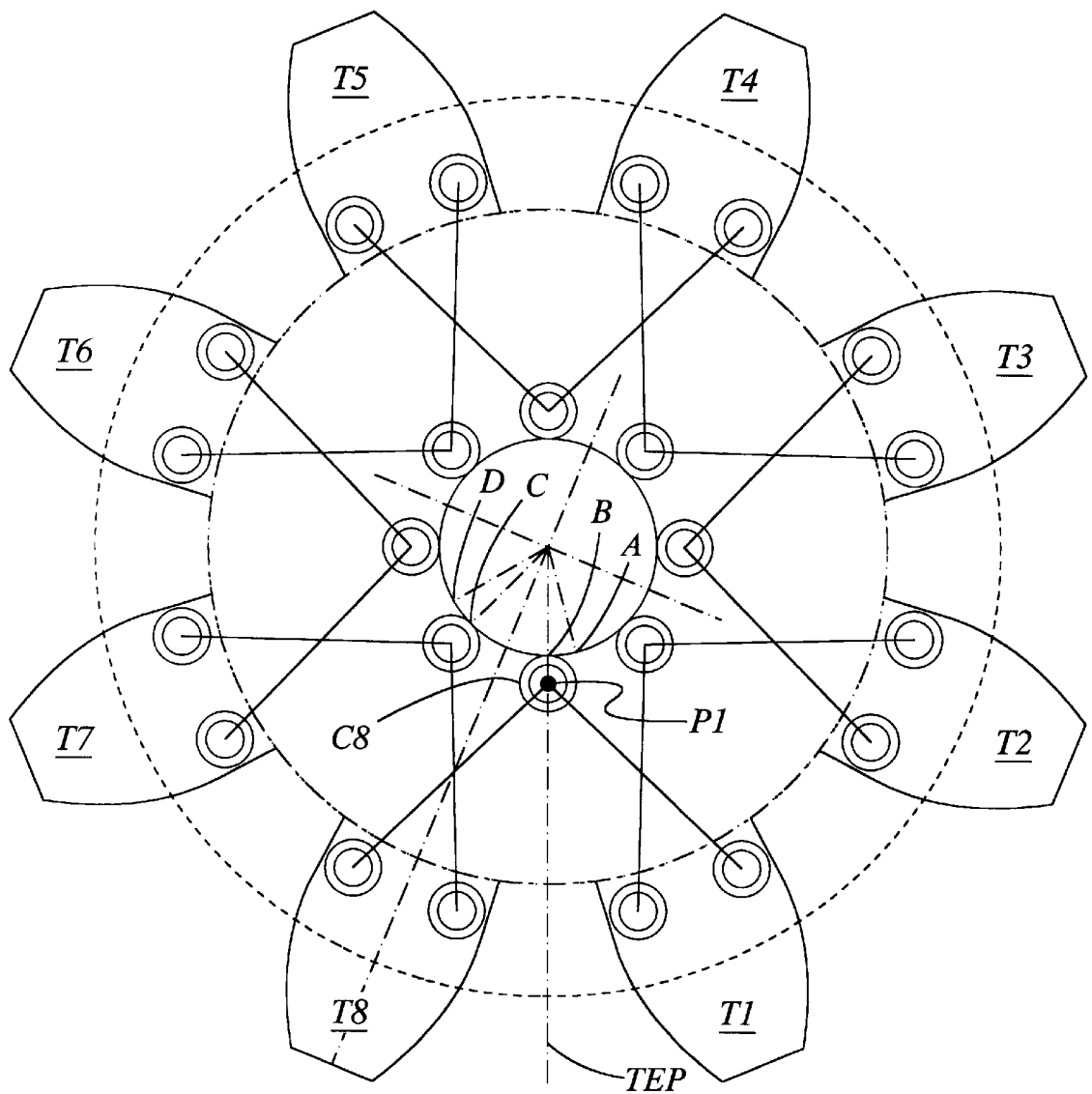
Figure 14A:
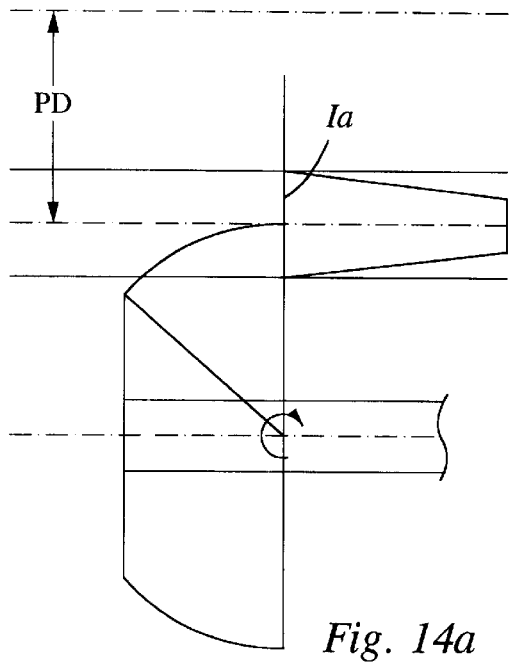
FIG. 14d illustrates engagement of the teeth with completely formed involutes.

The various positions of engagement of the drive and driven gears and the corresponding involutes are shown diagrammatically in FIGS. 11b and 14a, b, c and d. The positions shown in FIGS. 14a, b and c correspond approximately with the positions of the driven gear teeth shown in FIGS. 13a, b and a, respectively.

FIGS. 12a and 12b, show the engagement of teeth of the drive and driven gear at maximum and minimum pitch diameters of the drive gear, corresponding to minimum and maximum angles of intersection and velocity ratios. It should be noted that whereas, in FIG. 12a, the gears engage as spur gears but in FIG. 12b the gears engage as bevel gears, although the elliptical profiles corresponding to bevel gears are not illustrated, for simplicity.

Figure 14B:
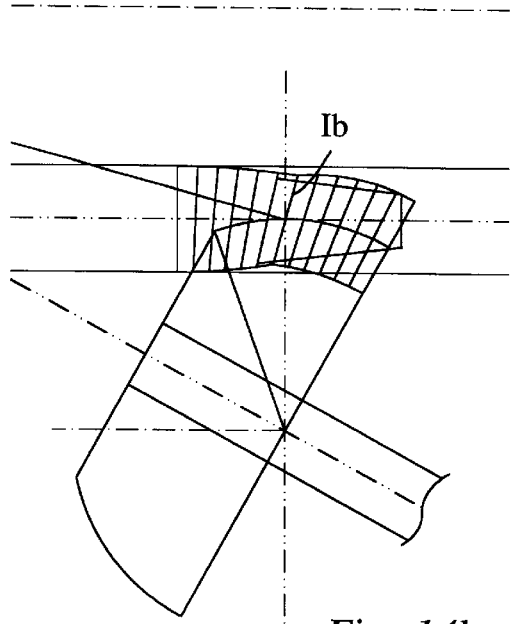
Figure 14C:
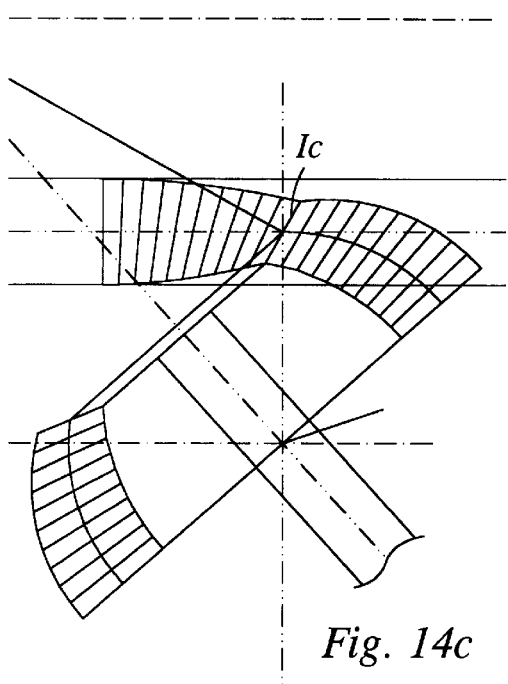
Figure 14D:
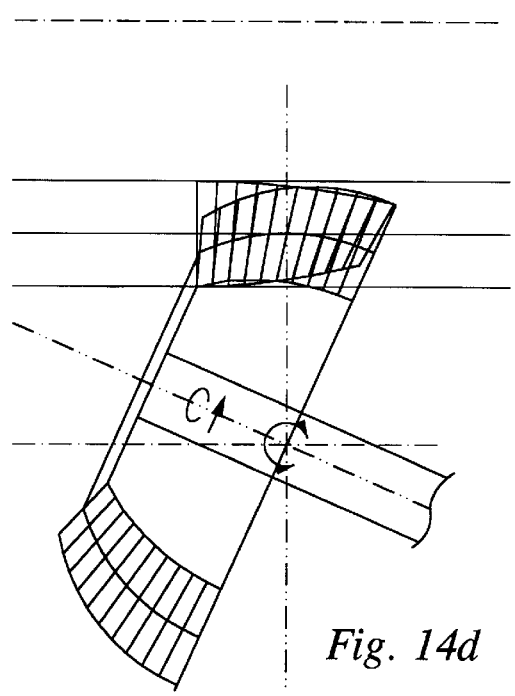
Figure 15:
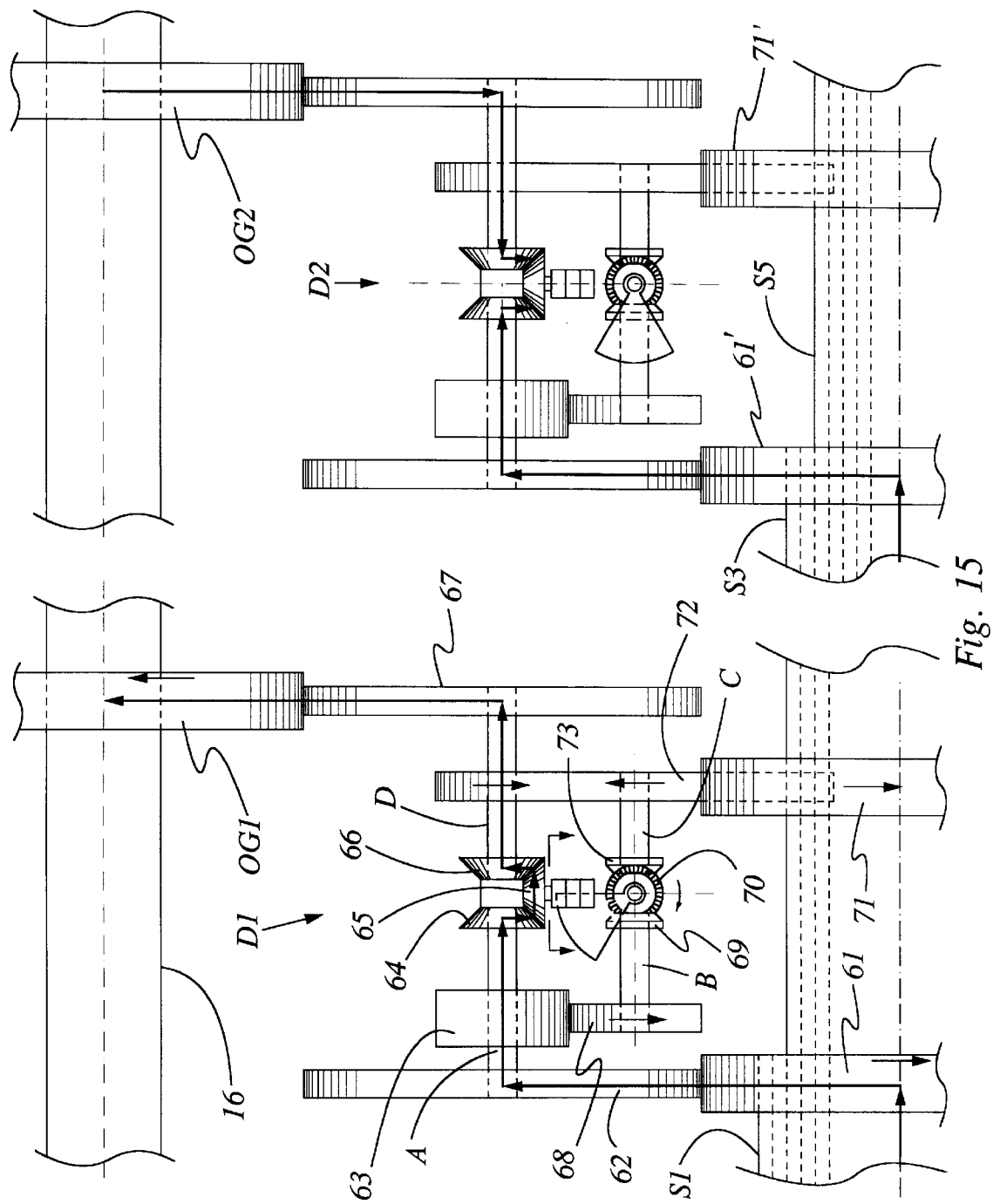
FIG. 15 is a schematic, fragmentary side view of the differential lock mechanism of the transmission shown in FIG. 1, to a larger scale.

FIGS. 14a, b and c, show the initial formation of the involutes corresponding with engagement of the drive and driven gears at increasing angles of intersection, while FIG. 14d shows the relative positions of the completed involutes of the gears in mesh. The positions of involutes designated 1a, 1b and 1c, in FIGS. 14a, b, c, correspond approximately to the involutes of engagement of the drive and driven gear at the specific angles of intersection shown in the drawings. The involutes are of increasing inclination towards the axial rear, corresponding with paths of engagement with drive gear teeth at increasing angles of intersection with the velocity ratio increasing from 1:1 (unity) at an angle of intersection of 0 degrees, shown in FIG. 14a, to 1.5:1 (1.5) corresponding to the engagement conditions of bevel gears. (An increase to a higher ratio may be possible in other embodiments.) Teeth T1–T7 are formed on radially extending lugs LG1–LG7 as forward arcuate axial and radial extensions of their respective sub-shafts S1–S7, for example, as shown particularly in FIGS. 7a, 7b; 8a, 8b; and 9a, 9b and 10a. The lug LG1 of tooth T1 is formed as a forward axial and radial extension of sub-shaft S1 leaving land 45 at the tip having an identical profile to increase the bearing area.

Figure 8A:
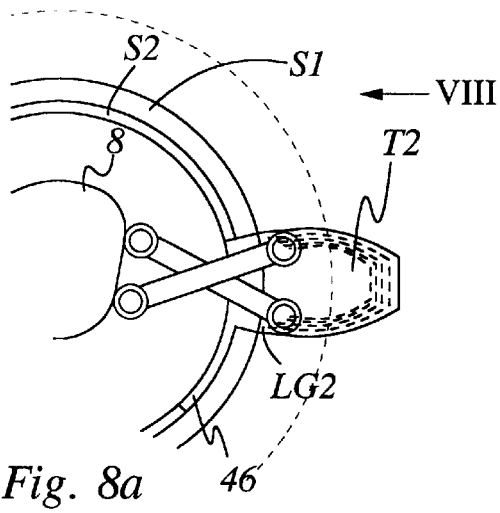
FIG. 8a is a schematic fragmentary front view of the driven gear showing more clearly the position of a second tooth and shaft.
Figure 8B:
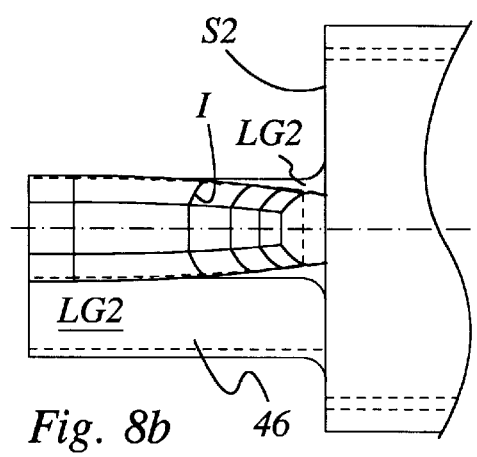
Figure 9A:
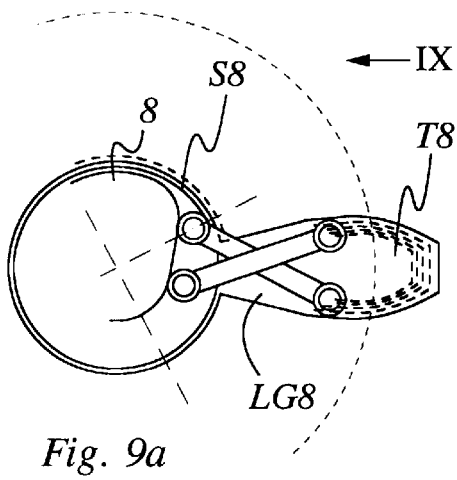
FIG. 9a is a schematic fragmentary front view of the driven gear showing more clearly the position of an eighth tooth and shaft.
Figure 9B:
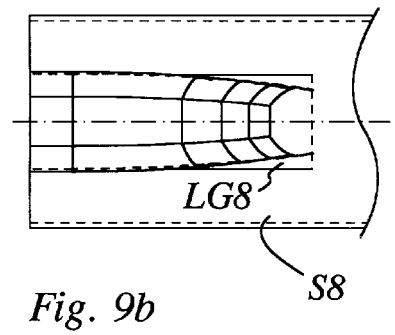

As shown in FIGS. 8a and 8b, the corresponding lug LG2 of sub-shaft 2 is of greater circumferential extent having an arcuate portion 46' extending laterally of the tooth T2 for increased strength/rigidity, as the walls of the sub-shafts S2–S8 are less thick than the wall of outermost sub-shaft T1. As shown in FIGS. 9a and 9b, the lug LG8 is flush with the front end of the sub-shaft S8, extending only radially outwardly, not axially, from the cylindrical wall. The lugs of successive teeth extending from cylindrical portions of successively smaller diameters being of increasing radial dimension to locate all teeth equidistant from the common rotational axis of the subshafts.

As shown particularly in FIGS. 6a, 6b and 10a, 10b, the linkage 7 interconnecting teeth T1–T8, comprises sixteen, identical compression rods or struts R1a, R1b; R2a, R2b . . . R8a, R8b etc., two rods being connected to each tooth, T1–T8, respectively. The rods are arranged as linked pairs, R1a, R2b; R1b, R8a etc, which are pivotally connected at inner ends to respective roller bearings, forming a rider or cam follower (C1–C8) following the guiding surface 52 of the pitch drum 8, and at respective opposite ends to respective bearings B1a,B2b; B1b,B8a on circumferentially remote edge portions of respective teeth T1, T2 etc of pairs of adjacent teeth T1, T2 etc providing V-linkages which vary in angle according to a rotational position of the riders (C1–C8) on the guiding surface 52, as shown in FIGS. 6a, 10a and 10b. The radially inner ends of a pair of rods are connected to opposite axial sides of respective cam follower bearings C1–C8, as shown in FIG. 6c and the bearings on the same lug are of different heights (axially) providing clearances for the rods R1a, R1b of adjacent pairs to cross over each other as shown in FIGS. 6b and 6c.

Figure 10C:
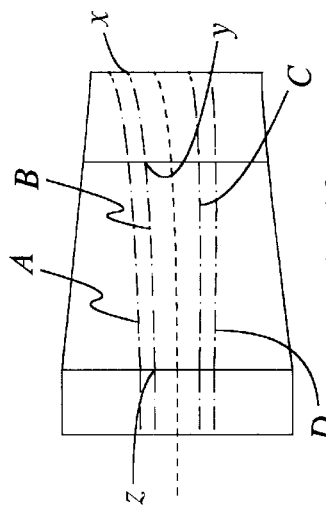
FIG. 10c is fragmentary bottom view showing the twist in the profile of the guide surface of the drum as it extends axially.
Figure 10B:
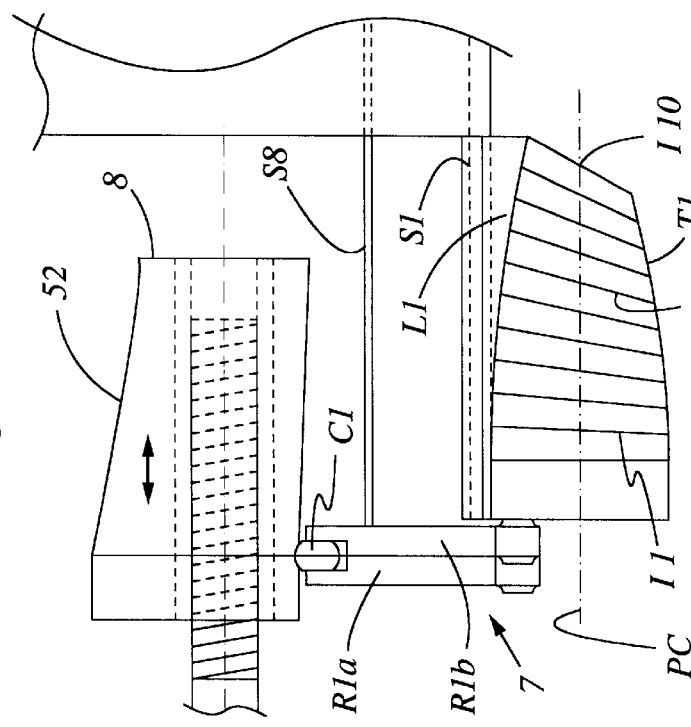
Figure 10D:
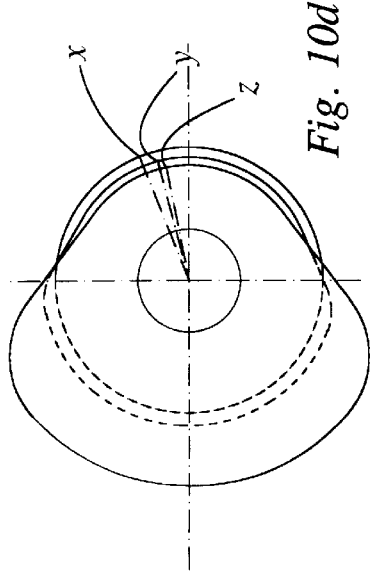
FIG. 10d is a schematic front view of the drum shown in FIG. 10c.
Figure 10A:
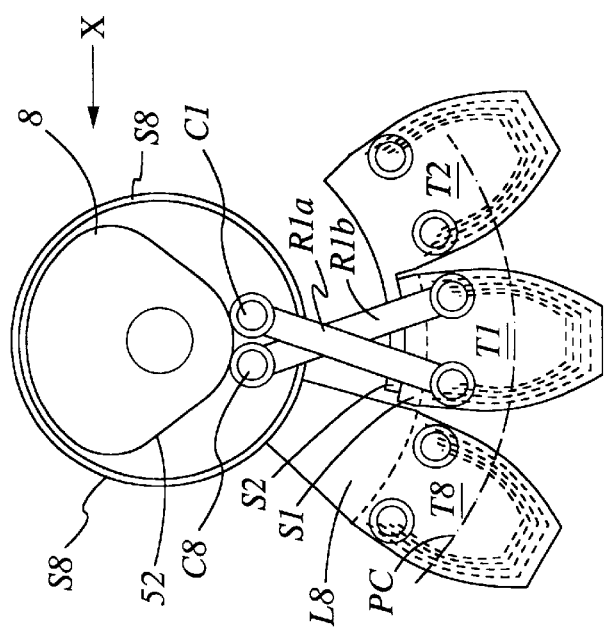
FIG. 10a is a schematic fragmentary front view of the driven gear showing more clearly the assembly of the first, second and eight teeth and their shafts.

As seen in FIGS. 1, and 10a–10d, the pitch control drum 8 tapers axially rearward providing a peripheral guiding surface 52 extending therearound with an axially tapering, conical guiding portion providing a truly arcuate guiding surface portion A–D (FIGS. 13b, 13c) of continuously axially varying radius so that in any one position of axial displacement, the profile of the arcuate guiding surface portion A–D is of constant radius in any one axial position which radius increases towards the axial rear of the drum. The drum profile is twisted as it extends rearward, as shown in FIG. 10c, with the arc of constant radius increasing in circumferential length, the twist advancing the engagement point B of the teeth of the driven gear with the teeth of the drive gear as it extends axially rearward (corresponding also to an increase in the velocity ratio of the transmission). The limits of the arcs of constant radius A–D and corresponding position of engagement of the teeth B are shown in FIGS. 13a, b and c, corresponding with engagement positions of the bearings on the drum of x, y, and z. FIG. 10d illustrates that the profile of the drum at the axial rear is in fact circular.

As the teeth of the driven gear are arranged to travel along that portion during engagement, the constant radius ensures that the driven teeth have a constant angular velocity throughout driven engagement. The included angle of the arcuate guiding surface portion—the arc of constant radius—increases in size toward the axial rear of the control drum and marginally in radius from a minimum at the highest velocity ratio shown in FIG. 13c until the drum profile is completely circular at the minimum velocity ratio, shown in FIG. 13a. The varying profile matches the effective circular pitch of the teeth of the driven gear to the circular pitch of the teeth of the drive gear at the varying velocity ratios determined by the varying angles of intersection.

It will be appreciated that the pitch control drum is mounted on suitable bearings (not shown) permitting axial movement without rotation thereof by the screw.

As mentioned above, in response to preselected parameters, the on-board computer alters the angle of inclination and therefore the pitch diameter of the drive gear 1 to provide the selected velocity ratio while also controlling the axial displacement of the pitch control drum 8, bringing a selected surface portion 52 into guiding alignment with cam follower bearings C1–C8 of the driven gear linkage 7 thereby altering the effective circular pitch of the teeth T1–T8 to match the circular pitch of the teeth of the drive gear to provide point contact.

Figure 13B:
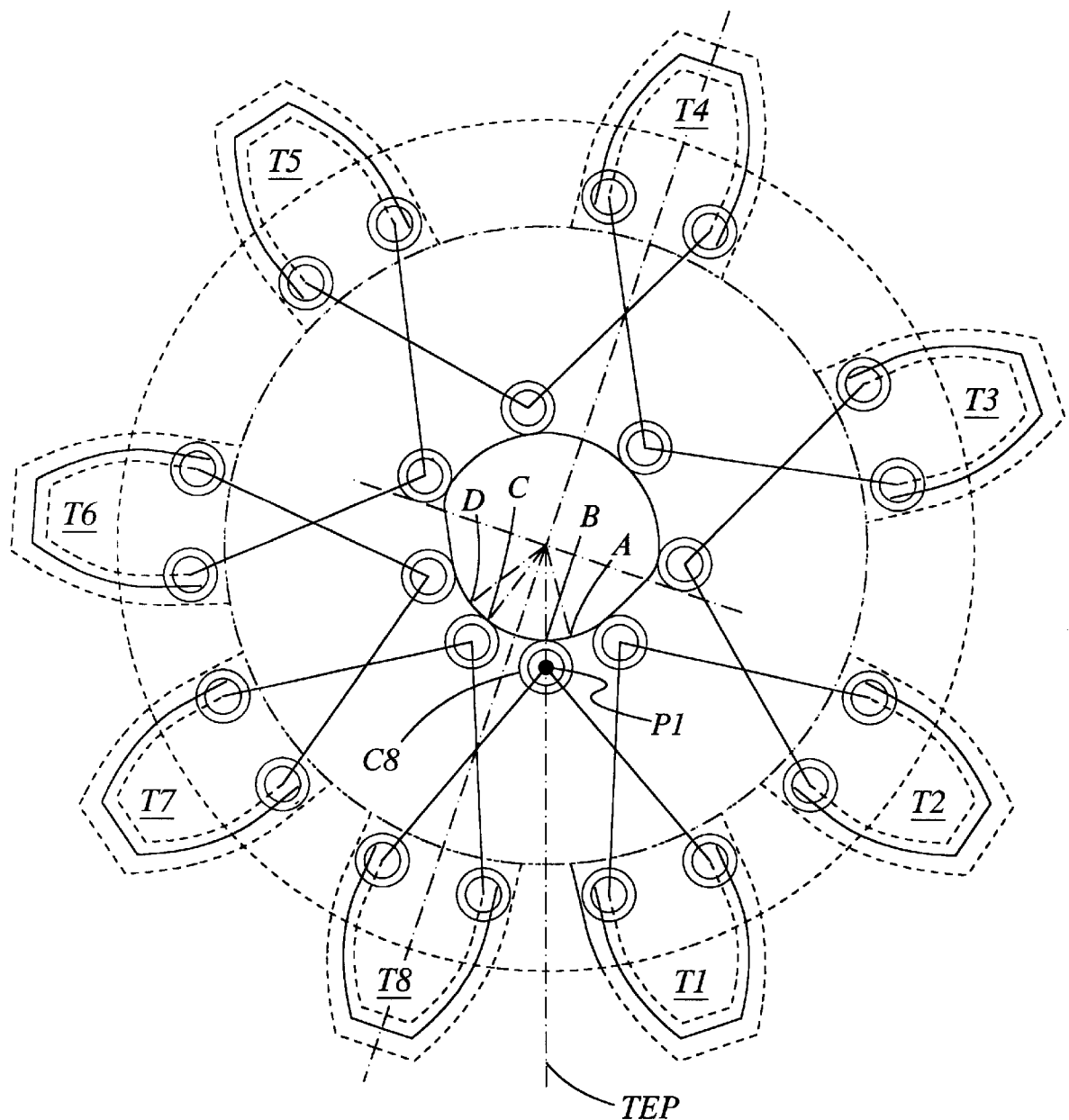
Figure 13C:
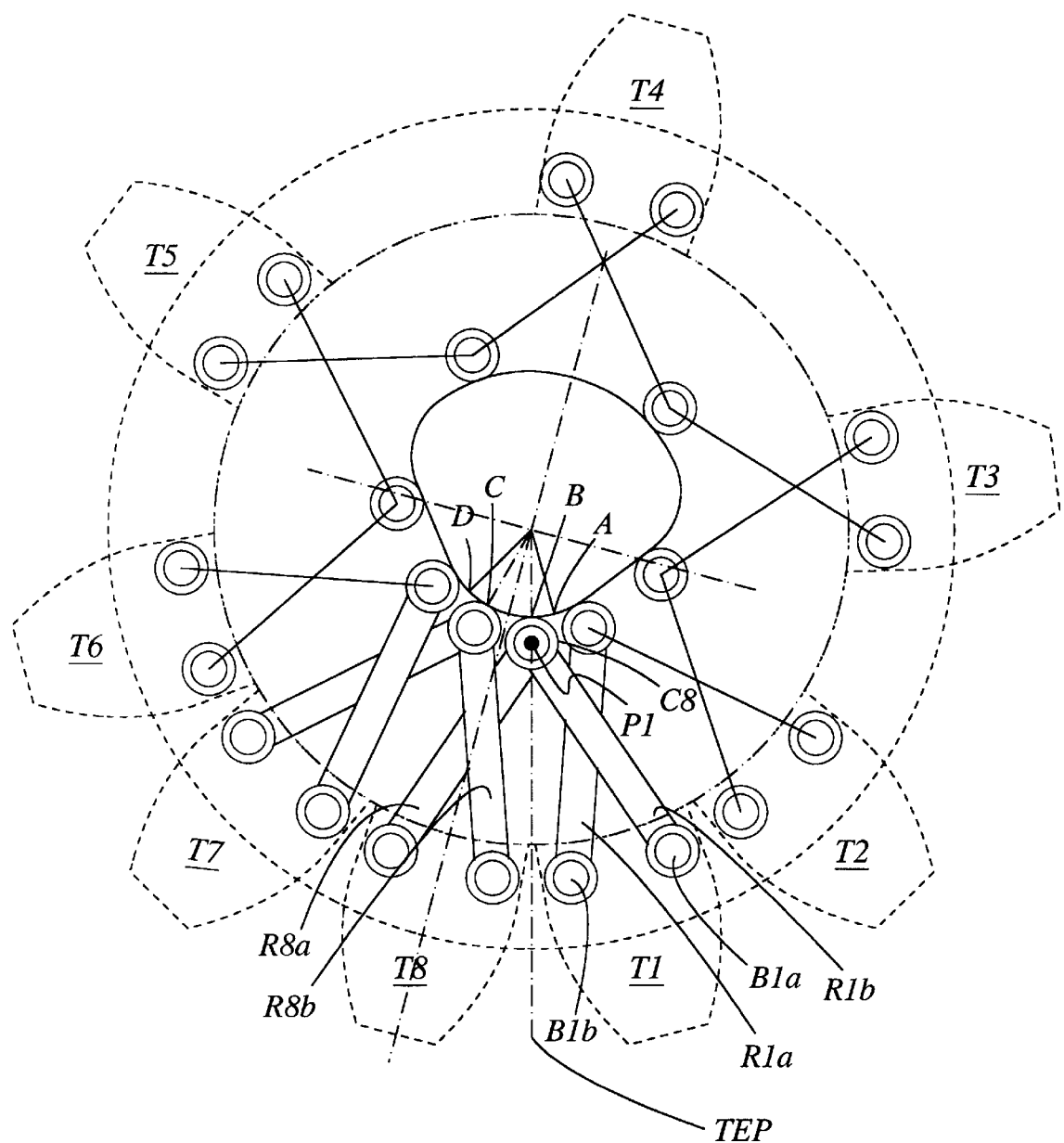

Engagement of the teeth of the drive and driven gear at 0, 25 (approximately) and 45 (approximately) degrees (max) angles of intersection, corresponding with lowest, intermediate and highest velocity ratios is shown schematically in FIGS. 14a–c and corresponding positions of the driven gear teeth which provide effective circular pitches along arc A–D matching the circular pitches of the drive gear, are shown schematically in FIGS. 13a–c. FIGS. 12a and 12b also show the teeth engaging at the lowest and highest velocity ratios, respectively. When the angle of intersection is 0 degrees, corresponding to the minimum velocity ratio of 1:1, the profile of the guiding surface 52 is entirely circular and the angular velocity of all teeth is constant, as shown in FIG. 13a. When the angle of intersection is at a maximum, corresponding to a maximum velocity ratio, the radius of the arc A–D has a minimum value. The effective circular pitch of a driven gear tooth 6 engaging the first gear is determined by the radius of the guiding portion A–D and, as pointed out above, the constant radius ensures that teeth engaging the first gear have a constant angular velocity throughout such engagement. The variation in tooth engagement points at the different circular pitches or separations corresponding with the different angles of inclination at maximum, intermediate and minimum velocity ratios are also indicated in FIGS. 13a, b and c. The synchronization of the teeth engagement point with gears that are starting to mesh is such that, when the gears start to engage, the center of bearing C8 will be at point P1. This is accomplished by the changing profile of the pitch control drum so that each increment of change will shift P1 by a predetermined angle, illustrated by FIGS. 13a, b and c, and FIGS. 10c and 10d. (A small deviation of synchronization can be permitted by further extending the angle between points A and B and C and D.)

The profile of the guiding surface of the pitch control drum is such that the cam follower bearings remain in contact therewith throughout their entire travel around the drum.

Whilst the angular velocities of the teeth will vary when outside arc A–D, it may be desirable for the transitions between portions of different curvature throughout the profile to be as smooth as possible to minimize acceleration and therefore stress and wear. The number of teeth may be varied but should be divisible to permit differential lock mechanisms to be connected to alternate teeth. Thus, although increasing the number of teeth might be viewed as increasing the complexity, an increase in number from eight to nine would permit the provision of only three differential locks, one for every third tooth, actually decreasing the complexity in that respect. Alternatively, providing a differential locking mechanism for each tooth would result in less stress imposed on the rods and bearings, essentially only stresses arising from changes in tooth inertia and vane sliding friction, resulting in less bearing stress but requiring a greater number of parts.

As a result of the taper of the pitch control drum, the guide surface does not extend axially, perpendicularly to the axes of the cam follower bearings which have an arcuate running profile, as shown in FIG. 6c, to accommodate the oblique engagement therewith. The guide surface is therefore profiled with corresponding obliqueness.

Referring particularly to FIGS. 15–18, the differential lock mechanism comprises four similar differential sets D1–D4 connected to respective rear ends of only alternate sub-shafts, S1, S3, S5 and S7 carrying alternate teeth T1, T3, T5, T7, respectively, whereby power is delivered to the output shaft 16 only from those alternate sub-shafts.

Alternate individual sub-shafts S1, S3, S5 and S7 of successive pairs of alternate sub-shafts S1, S3; S3, S5; S5,S7; S7,S1 are also connected via gears 69, 73 to respective ones of the four pairs of idle gears 70, 70a, 70', 70a', etc to control both the sectorial size and rotational operating position of respective of four latching vanes 75, 75' etc to lock and release respective differential latch mechanisms L1–L4. A difference in rotational speeds of individual shafts of pairs of shafts S1 and S3; S3 and S5; S5 and S7; S7 and S1 connected to opposite gears of respective latching vanes, varies the sectorial size of the corresponding latching vane.

An individual shaft is only connected to the output shaft 16 when the corresponding bearing is following the arc of constant radius AD. When a shaft rotates out from the arc of constant radius it also rotates the corresponding latching vane out from engagement unlocking the corresponding differential set so that power is no longer fed from that shaft to the output but the successive alternate shaft then has acquired the same rotational speed as the exiting shaft while rotating the next vane into the latching position locking the next of differential set to deliver power from the next alternate tooth and shaft to the output shaft 16.

Specifically, for differential set D1, shaft S1 is splined to spur gear 61, which meshes with gear 62 at 1:1 ratio. Gears 62, 63 and 64 are splined to shaft A. Gear 64 meshes with one side of idle gear 65. Gear 65 has an opposite side in mesh with gear 66 splined to shaft D also splined to gear 67, meshed with output gear OG1 which is splined to the common output shaft 16. Gears 64 and 66 have a ratio of 1:1, (although gears 64 and 65 can be in any ratio.)

Gear 63 meshes with gear 68 at 1:1 ratio. Gears 68 and 69 are splined to shaft B. Gear 69 meshes with gear 70 at 1:1 ratio. Shaft S3 is splined to gear 71 which meshes with gear 72 at 1:1 ratio. Gears 72 and 73 are splined to shaft C. Gear 73 meshes with gear 70a. Gears 70 and 70a are of equal sizes. As will be appreciated, gears 62 and 67 always rotate in opposite directions.

Figure 18:
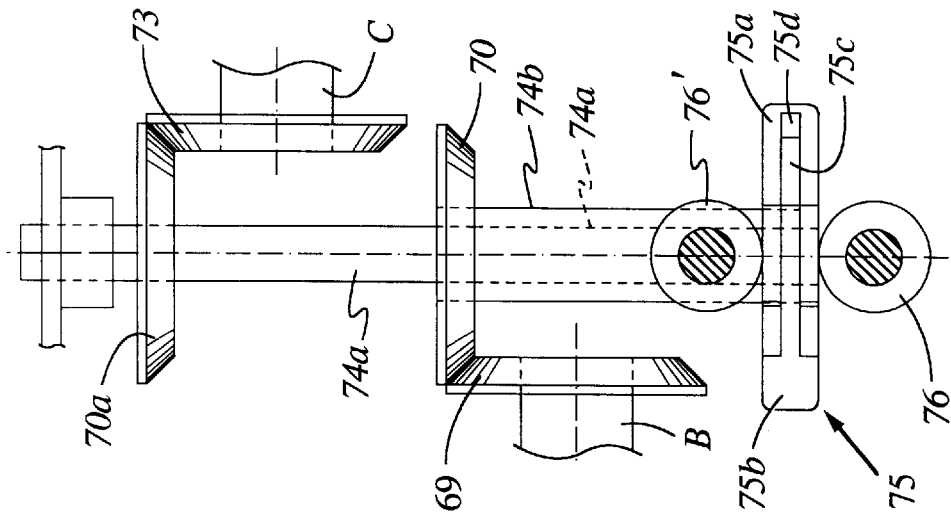
FIG. 18 is a cross-sectional view taken along lines 18—18 of FIG. 16.
Figure 17:
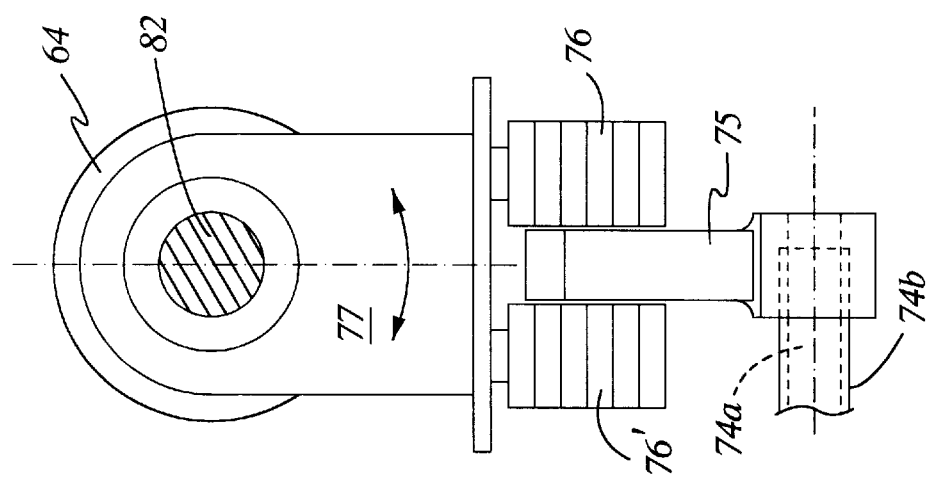
FIG. 17 is a cross-sectional view taken along lines 17—17 of FIG. 16, with some parts omitted for clarity.
Figure 16:
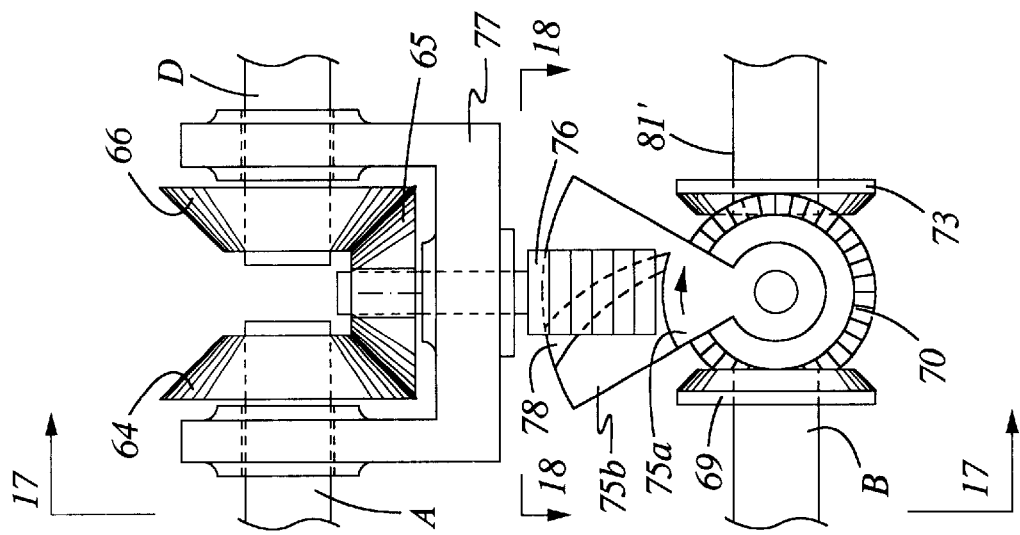
FIG. 16 is a similar view to FIG. 15 showing the differential lock mechanism to a larger scale.

As shown particularly in FIGS. 16–18, the gear 70a and the gear 70 are splined, respectively, to inner, solid and outer, hollow coaxial shafts 74a and 74b fixed at respective adjacent ends to angularly movable body parts 75a and 75b of expansible, sectorial latching vane 75. Body part 75b is formed with a tongue 75c slidingly received in a socket 75d in body part 75a permitting limited angular movement apart of parts 75a and 75b by differential rotational speeds of the shafts 74a and 74b, varying the sectorial size of the vane and time of latching engagement. The cooperating latching clevis is formed by a pair of roller bearing assemblies 76 and 76', each comprising multiple rollers and extending in parallel spaced apart relation from a center of yoke 77 which has respective arms rotatively mounted on shafts A and D adjacent gears 64 and 66. The yoke also rotatively mounts gear 65. The two body parts 75a, 75b abut along a curved seam 78 so that the discontinuity or gap left during expansion will not, at any point of rotation, underlie the entire line of contact between the bearings and the vane, obviating any bumps during rotation.

The differential locking set D2 is similar to set D1 with gear 61' splined to shaft S3 and gear 71' splined to shaft S5. Sets D3 and D4 are also similar with gears corresponding to gear 61 splined to shafts S5 and S7, and gears corresponding to 72 splined to shafts S7 and S1, respectively.

The differential lock timing will now be described, (with the gears at the highest ratio, although the operation is the same for all ratios), with reference to FIGS. 19a–c, 20a–d, 21a–d, and 22.

Figure 19A:
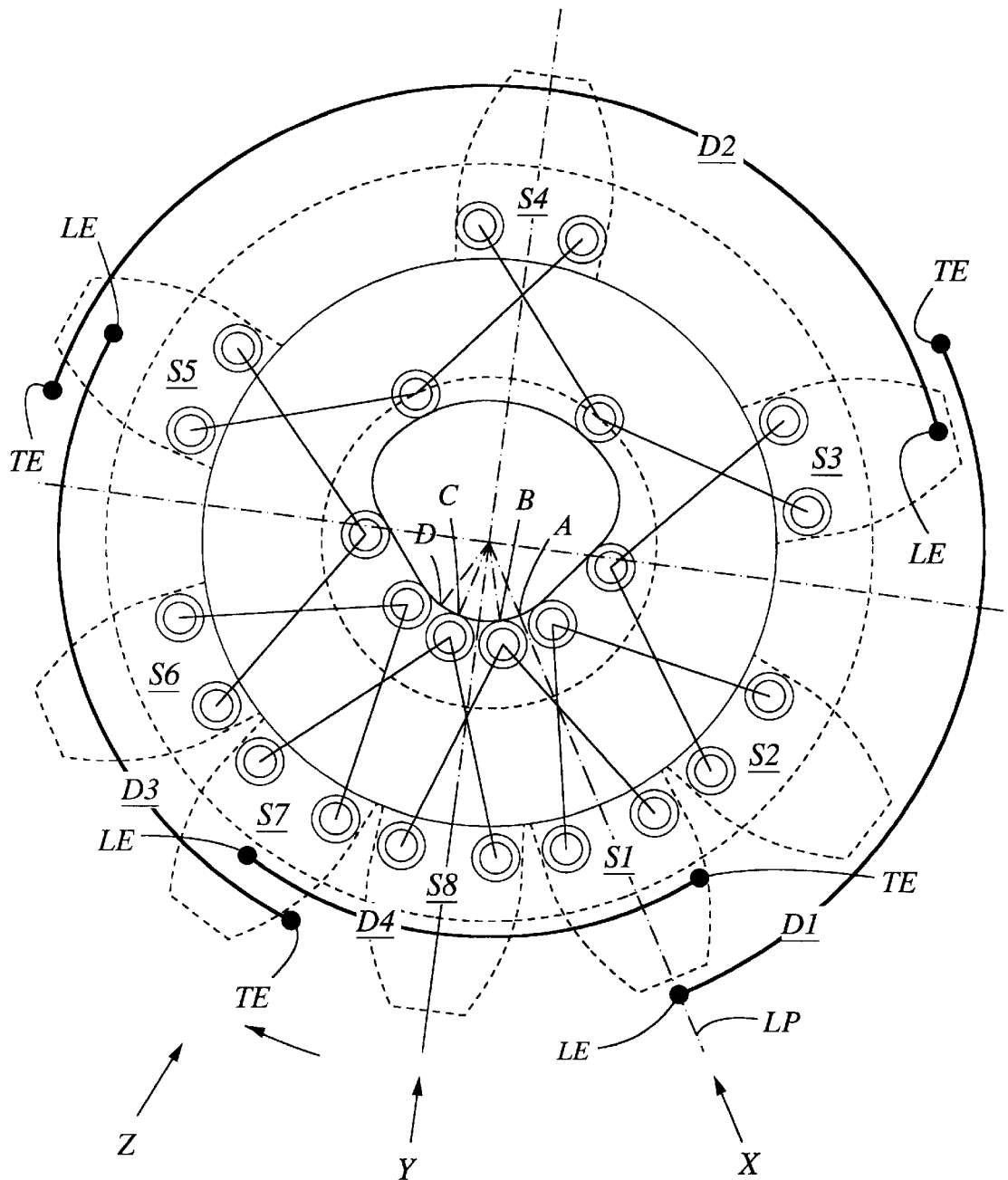
FIGS. 19a, b and c are schematic front views of the driven gear at the start of engagment of the drive gear with first second and third teeth, respectively, successive teeth.
Figure 19B:
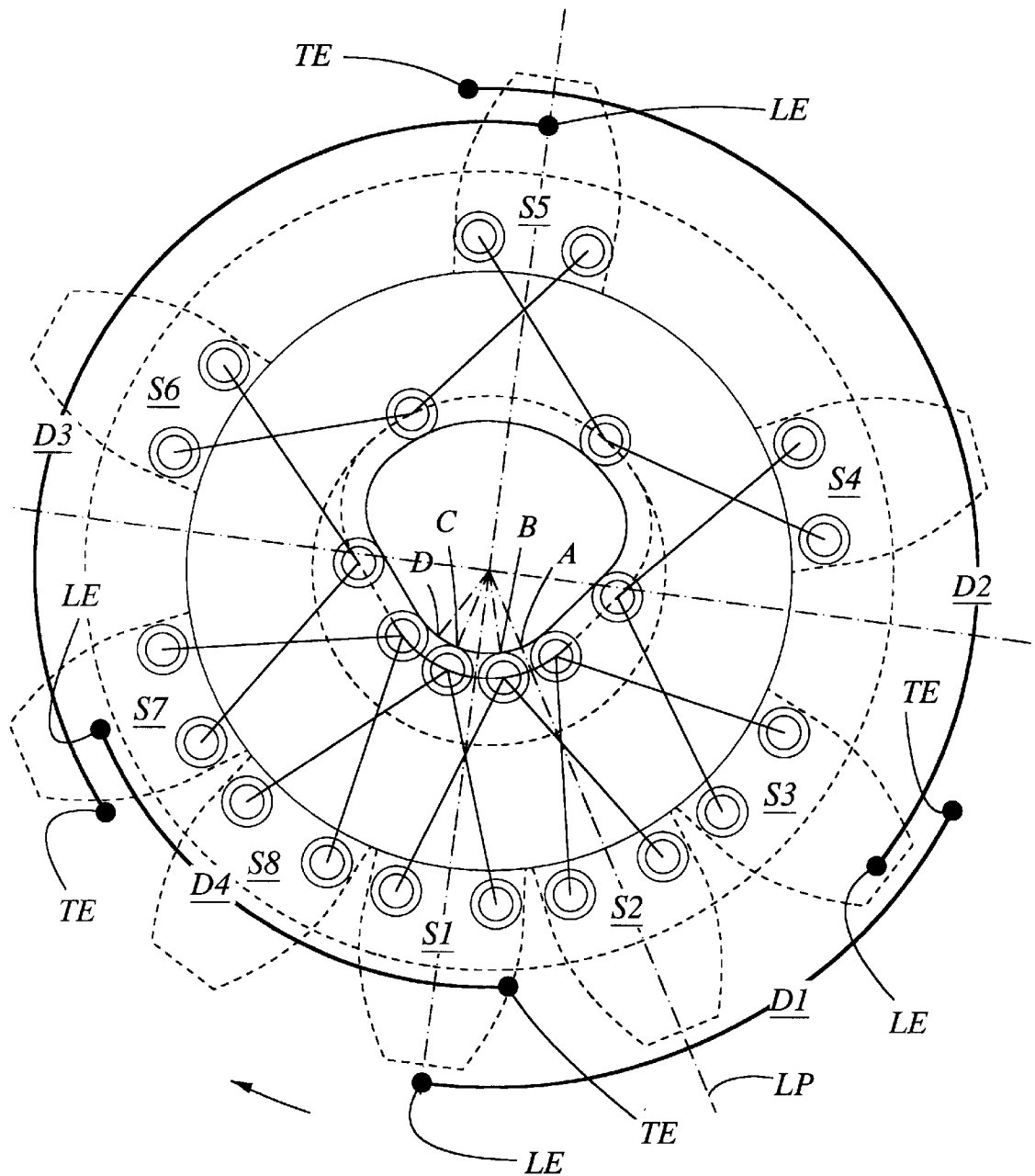
Figure 19C:
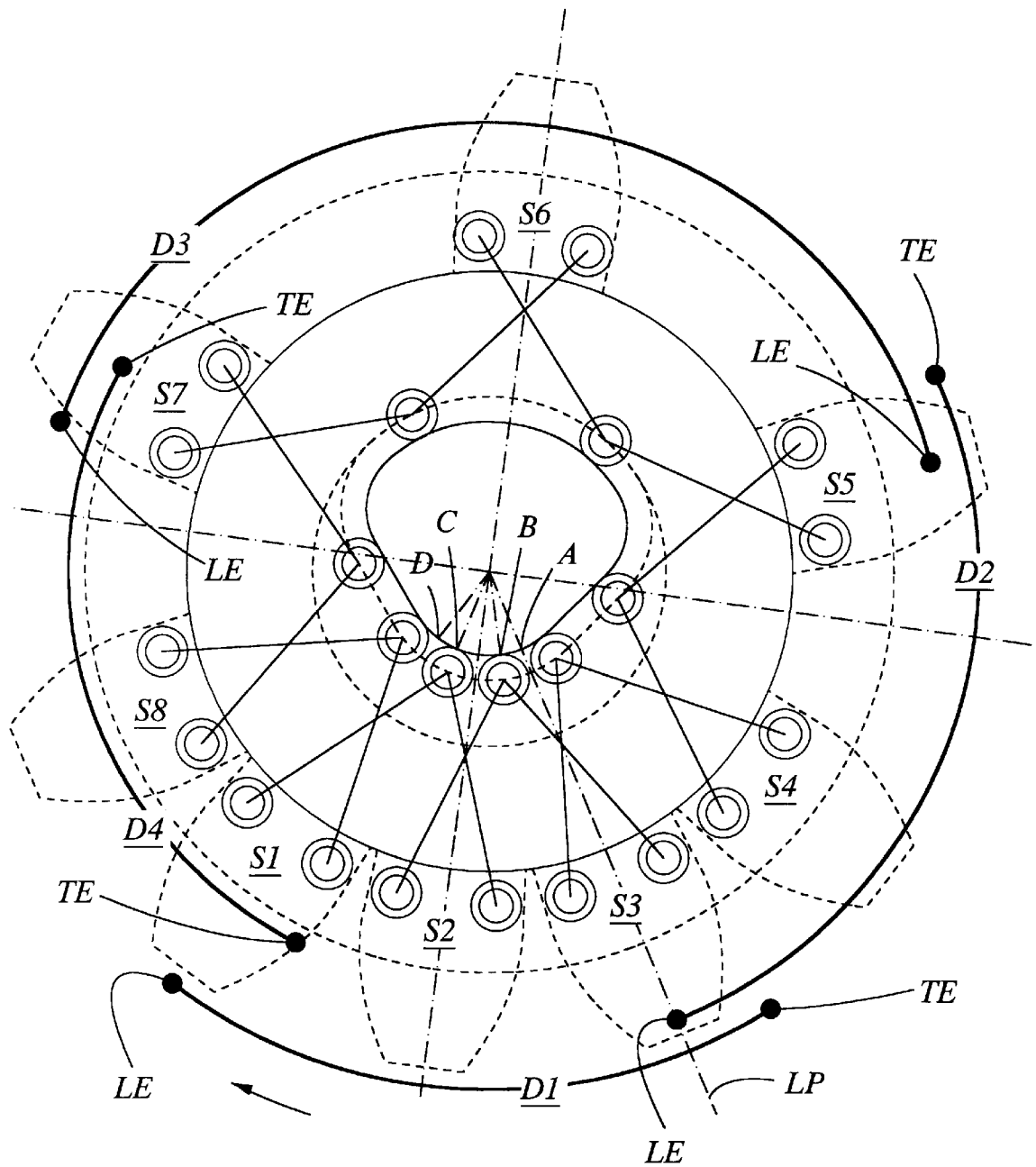

It should be noted that the arcs marked D1–D4 in FIGS. 19a–19c indicate the angular positions and angular (sectorial) sizes of the vanes of respective differential sets D1–D4 with leading and trailing edges of the vanes indicated by LE and TE, respectively, and overlapping portions corresponding to overlaps in angular positions of the vanes.

Line LP in FIGS. 19a–c indicates the locking position of the roller 76 corresponding to line CE of FIGS. 20a–d.

As indicated above, while tooth T1 is moving through arc AD, (containing the guide portion of constant radius), the vane of latching mechanism L1 remains in the clevis locking the differential D1 and the power from tooth T1 is therefore transmitted via shaft S1 to the output shaft 16. The vane is also rotated at the same, (now constant), speed as the tooth.

Figure 20A:
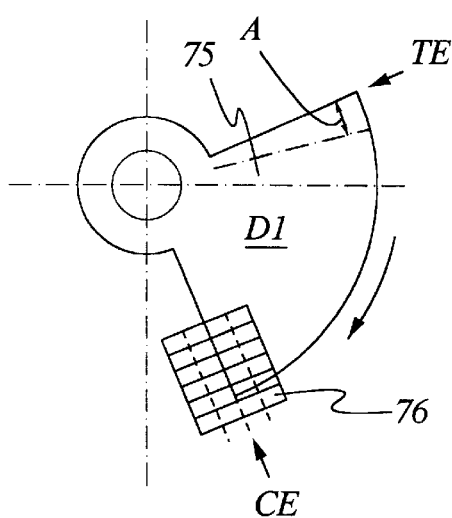
FIGS. 20a–d are diagrammatic views showing the relative positions of the locking vanes of respective differential sets D1–D4 at the start of engagement of the drive gear with the first tooth.
Figure 20B:
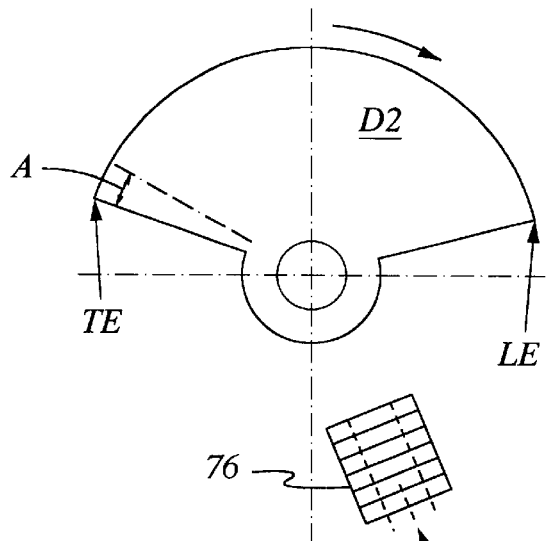
Figure 20C:
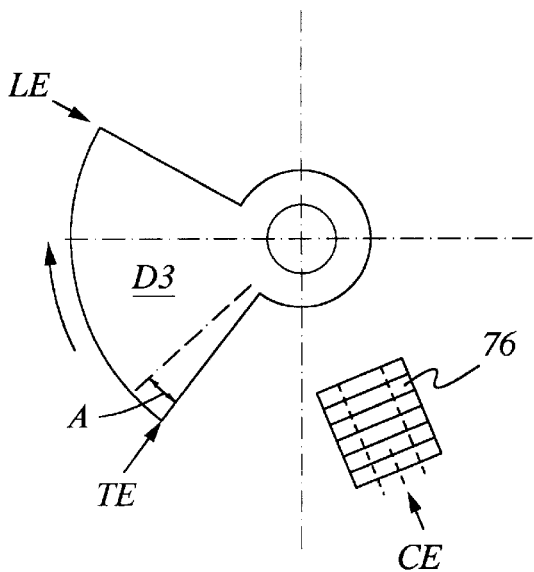
Figure 20D:
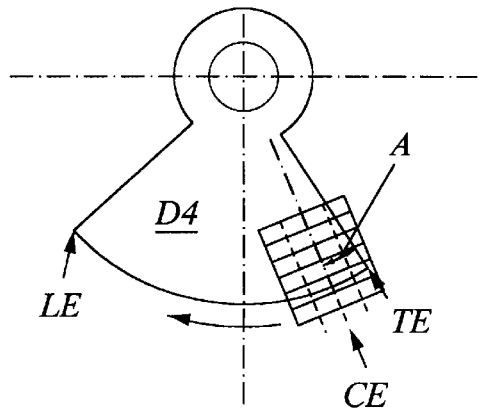

At the start of engagement of the drive gear with the first tooth T1 on shaft S1 as shown in FIGS. 19a, and 20a–d, as shown particularly in FIG. 20a, differential sets D1 and D4 are both locked as a leading edge of corresponding vane 75 of set D1 has just entered the center of the respective bearing 76 while a trailing edge of the vane of set D4 is also centered in the corresponding bearing of set D4, at the point of exit for release of the differential. FIGS. 20b and c show that the corresponding vanes of sets D2 and D3 are clear of the corresponding bearings which are unlocked allowing their yokes 77 to rotate freely. Power is therefore fed to the output shaft via both differentials D1 and D4 from shafts S1 and S7 as their bearings C8 and C7 are following the arc of constant radius AD.

(The portion of the arc CD providing extended angle A ensures that the velocity of the leading tooth (T7) remains constant through the subtending angle even after disengagement with the driving tooth. the angular overlap of arcs of vanes of differential sets D1 and D4 indicate that both differential sets D1 and D4 are locked for that period.)

The position at the start of engagement of the next tooth T2 is shown in FIGS. 19b and 21a–d. Tooth T1 remains engaged, only momentarily, because of the involute form, but even after disengagement of tooth T1 from the drive gear, set D1 remains locked and power is fed to the output from only shaft S1 as the driving force on tooth T2 is transmitted to shaft S1 via the struts R2b, R1a. As shown in FIGS. 21a–d, the sectorial sizes of all vanes has changed as a result of differences in individual shaft speeds as their bearings follow different peripheral portions of the control drum having different curvatures.

At the start of engagement of the next tooth T3 shown in FIG. 19c, tooth T1 has disengaged from the drive gear but the differential D1 is still engaged, as shown in FIG. 22a, so that power from sub shaft S1 is still fed to the output, S1 being driven via struts R2b, R1a. The respective sectorial sizes and rotational positions of vanes of differential sets D1, D2, D3 and D4 now corresponds to those of differential sets D4, D1, D2 and D3, respectively in FIGS. 19a and 20a–d.

Figure 21A:
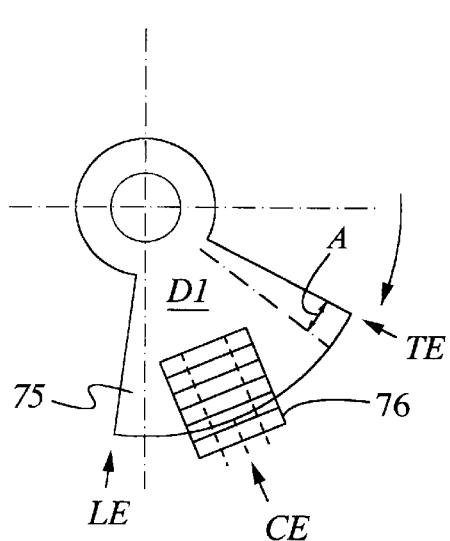
FIGS. 21a–d are diagrammatic views showing the relative positions of the locking vanes of respective differential sets D1–D4 at the start of engagement of the second next tooth.
Figure 21B:
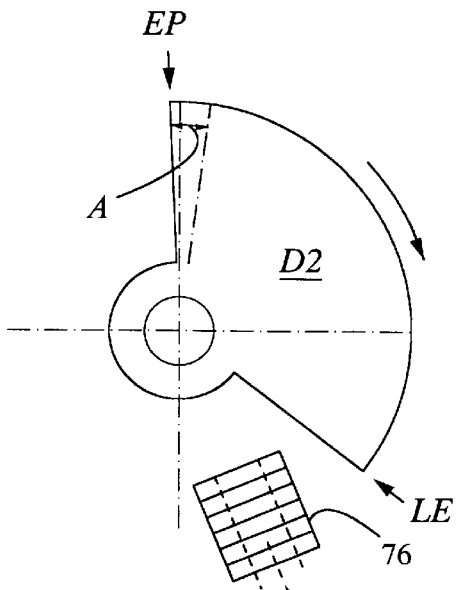
Figure 21C:
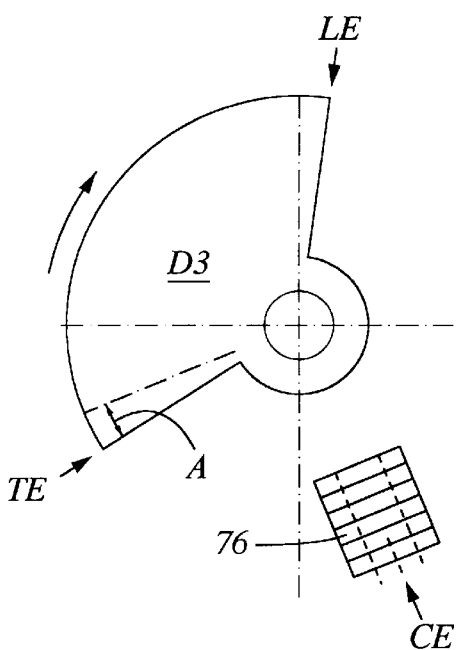
Figure 21D:
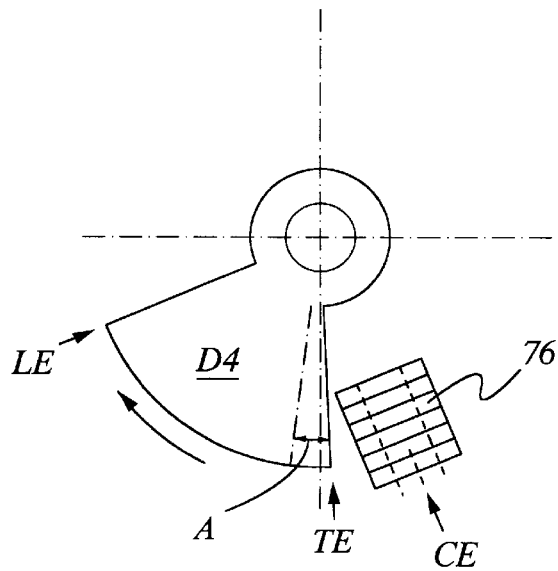
Figure 22:
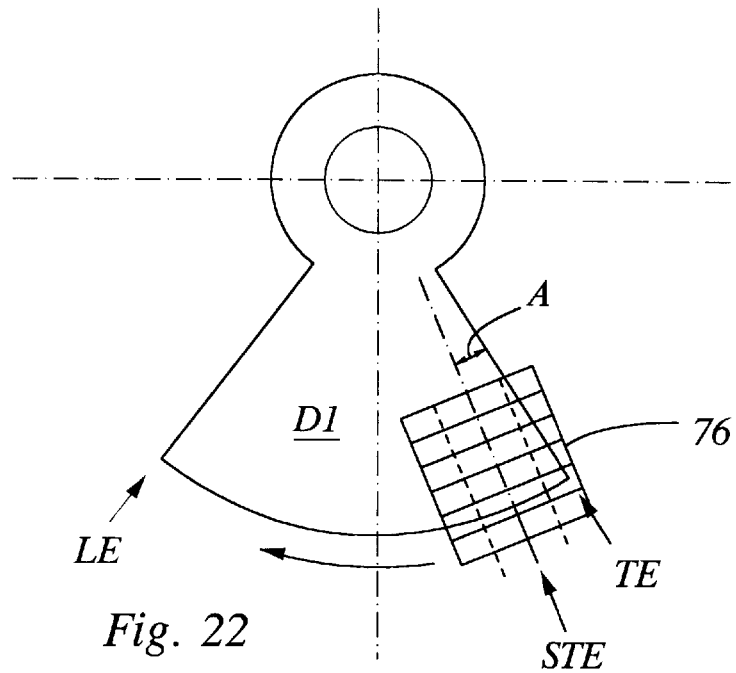
FIG. 22a is a diagrammatic view of the locking vane of the first differential set at the start of driving engagement of the third tooth.
Figure 23:
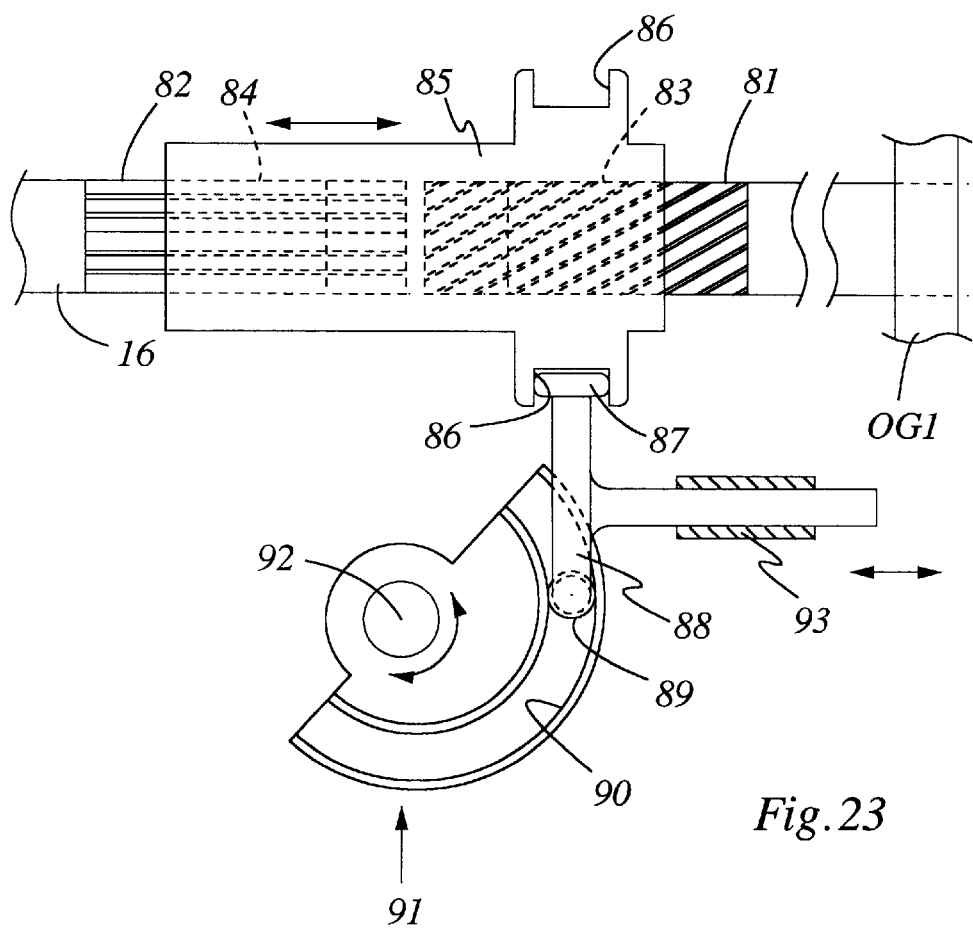
FIG. 23 is a fragmentary plan view of a pitch control compensator.

Thus, as the tooth T1 is moved through angle BC the vane has moved through the same angle to the position shown in FIG. 21a, (which corresponds in position to the beginning of the second tooth engagement). Bearing C8 has moved from B to C on the guide surface of the drum 8 while bearing C1 has entered the guide surface portion of constant radius and is located at B. Power is then fed to the output shaft 16 from shaft S1 as differential set D1 is locked The circular pitch change compensator PC1, shown in FIG. 23, prevents rotation of the output shaft 16 otherwise caused by axial movement of the pitch control drum 8 in changing the effective circular pitch of the driven gear and by rotation of the drive gear arising from operational movement of the gear train 14 varying the angle of intersection, being transmitted from the common output shaft 16' to the final output shaft 16. The compensator comprises first and second stub shafts 81 and 82, splined between shafts 16 and 16', respectively, and formed with helical and axially splined surfaces 83 and 84, respectively, received with axial clearances in correspondingly splined sockets of a splice sleeve 85. An external helical channel 86 is formed around one end of the splice sleeve 85 and receives a positioning roller 87 mounted on one end of a connecting arm 88 having an opposite end mounted on a cam follower 89 which travels in an eccentric cam groove 90 of a cam housing 91 of predetermined profile, mounted for rotation on axis 92. Rotation of the cam housing 91 by a servo motor responsive to the axial position of the pitch control drum 8 (or via the on-board computer) displaces arm 88 in sleeve guide 93 moving the sleeve housing 85 axially in synchronism with drum movement.

Rotation of any of gears OG1–4 will be transmitted to output shaft while sleeve 85 is restrained from axial movement. However, incremental rotation of OG1–4, caused by a change in circular pitch arising from axial displacement of the pitch control drum and control gear 14 will rotate the first, helically splined stub shaft 81 in the same direction and would also be transmitted to the output. However, simultaneous rotation of the cam member causes an equal, compensating translational shift of the sleeve 85 which is only sufficient to take up the incremental rotation of the pitch change as lost rotational motion. In the absence of translational movement of the sleeve 85, as when held stationary by the engagement of the roller 87 in the channel 86, corresponding to no movement of the cam housing 91, all rotational movement of gear 63 will be transmitted via gear 64 to the final output shaft.

The compensator could be omitted where rod and bearing mechanisms of the driven gear, and control drum bearings can withstand stress produced by the operation of the pitch control drum and the rotation of the drive gear in varying the angle of intersection and when the servo motor is sufficiently strong to drive the output.

Figure 24:
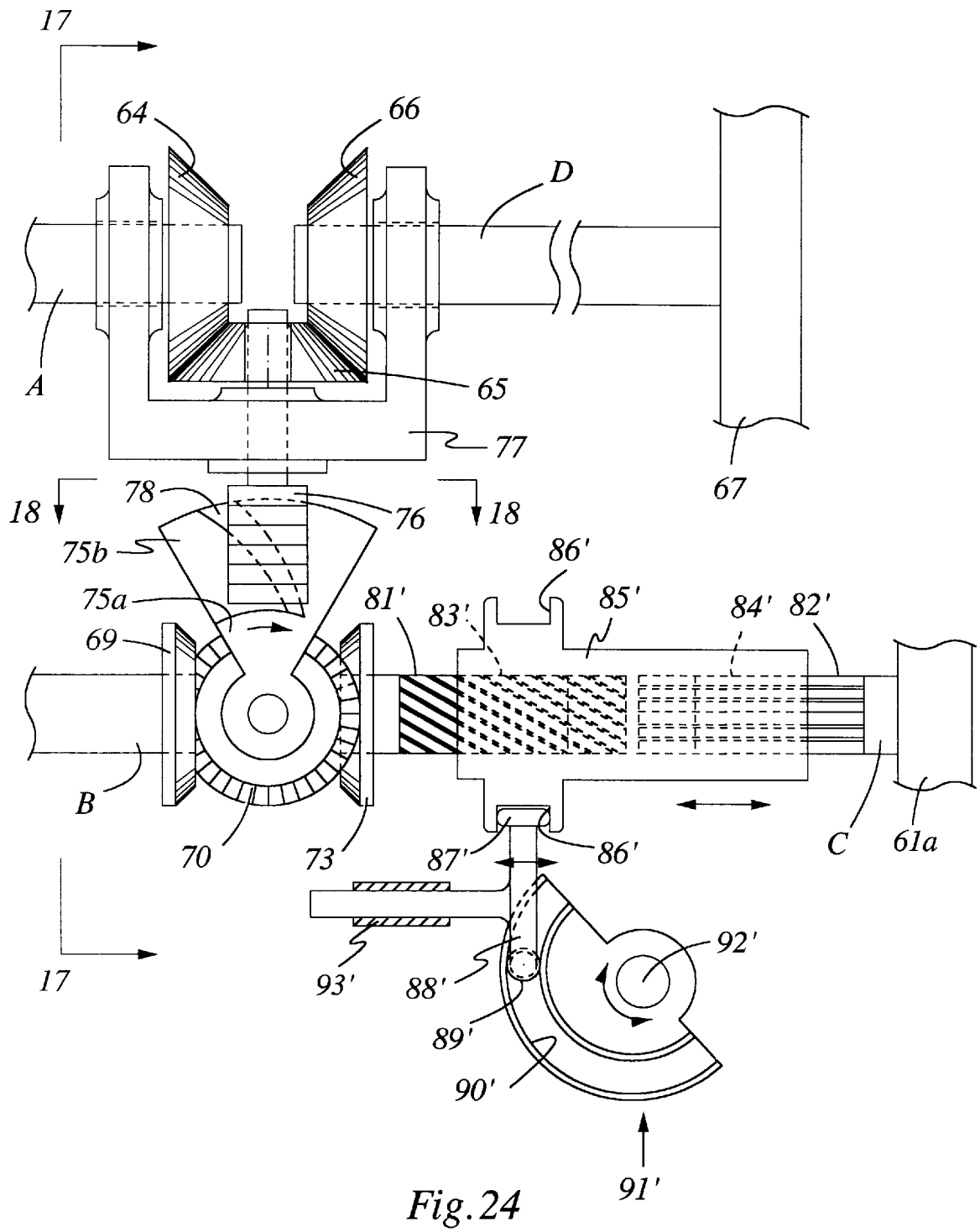
FIG. 24 is a fragmentary plan view of an alternative vane control mechanism.

A disadvantage of the differential locking mechanism described above is that it results in a continuous change in sectorial size, increasing wear. This can be avoided by employing an external control according to a predetermined cam profile. In an alternative embodiment, as shown in FIG. 24, shaft 81' of gear 73' is splined helically to sleeve form shaft 85' of a similar mechanism to pitch compensator PC1 so that linear reciprocation of the shaft is produced by rotation of the cam housing 91' by a servo responsive to pitch change, pivoting the vane portions relatively to alter the sectorial size in synchronism with pitch change.

In this embodiment, there is no requirement for gear 72 to drive the bottom portion of the differential lock. Instead gear 61 is connected to gear 61a at 1:1 ratio to drive shaft C and associated mechanism. Displacement of sleeve 85' rotates shaft 74a to vary the sectorial size of the vane.

Although many gear profiles are possible the described involute profile is preferred because it provides an overlapping power transfer feature.

In an alternative embodiment, one gear may be conical, and mounted for axial movement at a constant angle of intersection for meshing with the other gear which has teeth relatively movable in the direction of shaft rotation to change the effective circular pitch to match the circular pitch of the conical gear in different axial positions. However, this will not normally provide a condition of overlap resulting in undesirable interrupted torque during rotation.

I claim:

1. A continuously variable gear transmission comprising:
    a drive gear and a driven gear on respective shafts;
    one of the drive gear and driven gear being substantially hemispherical providing an axially varying pitch diameter and an axially varying effective circular pitch, another of the drive gear and driven gear having a constant pitch diameter and having teeth which taper axially in an opposite sense to the axially varying effective circular pitch of said one gear;
    means for moving teeth of said another gear relatively to continuously vary an effective circular pitch of selected teeth thereof to match a circular pitch of the teeth of said one gear for ensuring meshing engagement throughout the varying axial positions, whereby the velocity ratio of the transmission is varied continuously;
    the moving means comprising a pitch control drum having a guiding surface extending therearound with an axially tapering, conical guiding portion providing an arcuate guiding surface portion of constant transverse and continuously axially varying radius and means for linking adjacent teeth of said another gear together for relative movement as a ring around the guiding surface of the drum so that the effective circular pitch of selected teeth engaging said one gear is determined by the radius of the guiding portion and so that a tooth engaging said one gear has a constant angular velocity throughout the engagement;
    the shaft of said another gear comprises a plurality of coaxial sub-shafts carrying respective individual teeth and mounted coaxially with the drum;
    means for continuously and simultaneously varying both an angle of intersection of the shafts, thereby bringing different circumferential locations of the said one gear having different pitch diameters into engagement with said another gear and a relative axial position of engagement of the gears so as to change a circular pitch of said another gear to match a circular pitch of said one gear; and,
    means for drivingly connecting the selected teeth of said another gear to one of a power input and output only when the selected teeth are at said constant angular velocity.

2. A continuously variable, gear transmission according to claim 1 wherein the means for drivingly connecting a respective tooth/shaft of a gear to one of a power input and output comprises a differential mechanism operatively connected to at least some of said sub-shafts.

3. A continuously variable, gear transmission according to claim 3, wherein the individual sub-shafts comprise cylindrical sleeves nested one inside another for relative rotational movement.

4. A continuously variable gear transmission according to claim 1, wherein the linking means comprises a series of rods of equal length arranged in pairs equal in number to the number of teeth of the second gear, each rod of each pair being pivotally connected at one end to a rider following the guiding surface of the drum and at respective opposite ends to respective teeth of a pair of adjacent teeth providing a V-linkage having an angle which varies according to a rotational position of the rider on the guiding surface.

5. A continuously variable gear transmission according to claim 4, wherein respective opposite ends of respective rods of respective pairs are pivotally connected to locations adjacent remote edge portions of the pair of adjacent teeth so that adjacent rods of adjacent pairs cross each other.

6. A continuously variable gear transmission comprising:
    a drive gear and a driven gear on respective shafts;
    one of the drive gear and driven gear having a continuous axial taper providing an axially varying pitch diameter, another of the drive gear and driven gear having teeth mounted for relative movement about a shaft axis;

means for continuously varying a relative axial position of engagement of the gears so as to vary the effective pitch diameter of the said one gear; and, means for moving teeth of said another gear relatively to continuously vary an effective circular pitch of selected teeth thereof to match a circular pitch of the teeth of said one gear for ensuring meshing engagement throughout the varying axial positions, whereby the velocity ratio of the transmission is varied continuously.

7. A continuously variable gear transmission according to claim 6 wherein said one gear is substantially hemispherical and means are provided for varying an angle of intersection of the shafts thereby bringing different circumferential locations of the said gear having different pitch diameters into engagement with said another gear.

8. A continuously variable gear transmission according to claim 7 including means for drivingly connecting the selected teeth of said another gear to one of a power input and output only when the selected teeth are at said identical angular velocity.

9. A continuously variable gear transmission according to claim 8 Including means for drivingly connecting the selected teeth of said another gear to one of a power input and output only when the selected teeth are guided by the guiding surface portion of constant radius of the pitch control drum.

10. A continuously variable gear transmission according to claim 6 wherein the shaft of said another gear comprises a plurality of coaxial sub-shafts carrying respective individual teeth.

11. A continuously variable gear transmission according to claim 10 wherein the means for drivingly connecting a respective tooth/shaft of the second gear to one of a power input and output comprises a differential mechanism operatively connected to at least some of said sub-shafts.

12. A continuously variable gear transmission according to claim 10, wherein the individual sub-shafts comprise cylindrical sleeves nested one inside another for relative rotational movement.

13. A continuously variable, gear transmission according to claim 6, wherein the means for continuously varying the effective circular pitch of the selected teeth comprises a pitch control drum having a guiding surface extending therearound with an axially tapering, conical guiding portion providing an arcuate guiding surface portion of (constant transverse and) continuously axially varying radius, and means are provided for linking adjacent teeth of the second gear together as a ring mounted on the guiding surface of the drum for guided rotation therearound so that the effective circular pitch of a tooth engaging the first gear is determined by the radius of the guiding portion and that a tooth engaging the first gear has a constant angular velocity throughout engagement.

14. A continuously variable, gear transmission according to claim 13, wherein the linking means comprises a series of rods of equal length arranged in pairs equal in number to the number of teeth of the second gear, each rod of each pair being pivotally connected at one end to a rider (cam follower) following the guiding surface of the drum and at respective opposite ends to respective teeth of a pair of adjacent teeth providing a V-linkage having an angle which varies according to a rotational position of the rider on the guiding surface.

15. A continuously variable, gear transmission according to claim 14, wherein respective opposite ends of respective rods of respective pairs are pivotally connected to locations adjacent remote edge portions of the pair of adjacent teeth so that adjacent rods of adjacent pairs cross each other.

16. A continuously variable gear transmission according to claim 6 including means for drivingly connecting the selected teeth of said another gear to one of a power input and output only when the selected teeth are at said identical angular velocity.

17. A continuously variable gear transmission according to claim 16 Including means for drivingly connecting the selected teeth of said another gear to one of a power input and output only when the selected teeth are located at a minimum circular pitch relative to circular pitches of remaining teeth of said another gear for any particular axial position.

18. A continuously variable gear transmission according to claim 7 wherein the shaft of said another gear comprises a plurality of coaxial sub-shafts carrying respective individual teeth.

19. A continuously variable gear transmission according to claim 18 wherein the means for drivingly connecting a respective tooth of the second gear to one of a power input and output comprises a differential mechanism operatively connected to at least some of said sub-shafts to respond to different angular positions thereof.

20. A continuously variable gear transmission according to claim 18, wherein the individual sub-shafts comprise cylindrical sleeves nested one inside another for relative rotational movement.

21. A continuously variable gear transmission according to claim 7, wherein the means for continuously varying the effective circular pitch of the selected teeth comprises a pitch control drum having a guiding surface extending therearound with an axially tapering, conical guiding portion providing an arcuate guiding surface portion of (constant transverse and) continuously axially varying radius, and means are provided for linking adjacent teeth of the second gear together as a ring mounted on the guiding surface of the drum for guided rotation therearound so that the effective circular pitch of a tooth engaging the first gear is determined by the radius of the guiding portion and that a tooth engaging the first gear has a constant angular velocity throughout engagement.

22. A continuously variable gear transmission according to claim 21, wherein the linking means comprises a series of rods of equal length arranged in pairs equal in number to the number of teeth of the second gear, each rod of each pair being pivotally connected at one end to a rider (cam follower) following the guiding surface of the drum and at respective opposite ends to respective teeth of a pair of adjacent teeth providing a V-linkage having an angle which varies according to a rotational position of the rider on the guiding surface.

* * * * *